US007966644B2

(12) United States Patent
Noda et al.

(10) Patent No.: US 7,966,644 B2
(45) Date of Patent: Jun. 21, 2011

(54) METHOD, APPARATUS, AND COMPUTER PROGRAM FOR MANAGING ACCESS TO DOCUMENTS

(75) Inventors: Bintatsu Noda, Kawasaki (JP); Souichi Okada, Kawasaki (JP); Takashi Yoshioka, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1020 days.

(21) Appl. No.: 11/543,313

(22) Filed: Oct. 5, 2006

(65) Prior Publication Data
US 2007/0271592 A1 Nov. 22, 2007

(30) Foreign Application Priority Data

May 17, 2006 (JP) .................................. 2006-137961

(51) Int. Cl.
H04L 9/32 (2006.01)
G06F 21/22 (2006.01)
(52) U.S. Cl. .................. 726/1; 726/27; 713/176
(58) Field of Classification Search .......................... None
See application file for complete search history.

(56) References Cited

U.S. PATENT DOCUMENTS

| 7,036,149 B2 * | 4/2006 | Sonoda et al. ............... 726/27 |
| 7,100,047 B2 * | 8/2006 | Stamos et al. ............... 713/165 |
| 7,380,267 B2 * | 5/2008 | Arai et al. ............... 726/1 |
| 7,412,433 B2 * | 8/2008 | Anglin et al. ............... 1/1 |
| 7,506,365 B2 * | 3/2009 | Hirano et al. ............... 726/5 |
| 7,555,769 B1 * | 6/2009 | Shapiro et al. ............... 726/1 |
| 7,636,736 B1 * | 12/2009 | Kumar et al. ............... 1/1 |
| 7,693,878 B2 * | 4/2010 | Anglin et al. ............... 707/999.2 |
| 2003/0120649 A1 * | 6/2003 | Uchino et al. ............... 707/5 |
| 2003/0237005 A1 * | 12/2003 | Bar-Or et al. ............... 713/201 |
| 2006/0236369 A1 * | 10/2006 | Covington et al. ............... 726/1 |
| 2007/0157288 A1 * | 7/2007 | Lim ............... 726/1 |
| 2007/0266421 A1 * | 11/2007 | Vaidya et al. ............... 726/1 |
| 2008/0066150 A1 * | 3/2008 | Lim ............... 726/1 |
| 2008/0155641 A1 * | 6/2008 | Beavin et al. ............... 726/1 |

FOREIGN PATENT DOCUMENTS
JP 2002-175300 6/2002

* cited by examiner

Primary Examiner — Christopher A Revak
(74) Attorney, Agent, or Firm — Staas & Halsey LLP

(57) ABSTRACT

A computer program, apparatus, and method for managing access to documents, capable of identifying the exact events of document access on the basis of given access logs even when access policies are modified in the middle of operations. Upon receipt of an access policy setup request from a first client, an access policy manager adds a new access policy to the access policy database or modifies an existing access policy in an access policy database according to the request. A policy log collector then stores the records of such a new access policy or modified existing access policy in a policy log database. Afterwards an access log collector receives an access log for the document 5 from the second client 3 and saves it in the access log database 1c. When a third client issues a log request with a specific search keyword, a log searcher retrieves relevant policy log records and access log records that match with the specified search keyword.

10 Claims, 32 Drawing Sheets

FIG. 7

110 ACCESS POLICY DATABASE

| | |
|---|---|
| DOCUMENT AUTHOR | USER-Z |
| TARGET USER | USER-C |
| TARGET PC | PC-C |
| TARGET DOCUMENT | FILE-C |
| BROWSE ACCESS LIMIT | UNLIMITED |
| BROWSE PERMISSION PERIOD | 2005-11-22 14:18:11 -2005-11-30 23:59:59 |
| PRINT ACCESS LIMIT | NOT ALLOWED |
| PRINT PERMISSION PERIOD | - |
| WATERMARK OPTION | - |
| READER INVITATION | NO |
| AUTHOR NOTIFICATION | 2005-11-29 00:00:00 |

111, 112, 113

130 ACCESS LOG DATABASE

| DATE | FILE NAME | USER | SOURCE CLIENT | ACCESS EVENT |
|---|---|---|---|---|
| 2005-11-23 10:33:23 | FILE-A.doc | USER-A | PC-A | BROWSE |
| 2005-11-24 22:19:15 | FILE-B.doc | USER-B | PC-B | BROWSE |
| 2005-11-25 17:23:17 | FILE-A.doc | USER-C | PC-C | BROWSE |
| 2005-11-26 14:18:31 | FILE-C.doc | USER-B | PC-B | BROWSE |
| 2005-11-27 15:13:22 | FILE-B.doc | USER-B | PC-B | BROWSE (IMPROPER) |
| 2005-11-28 11:19:24 | FILE-B.doc | USER-A | PC-A | BROWSE |
| 2005-11-29 11:24:18 | FILE-C.doc | USER-C | PC-C | BROWSE (IMPROPER) |

FIG. 9

140 POLICY LOG DATABASE

| EDITOR NAME | USER-Z (AUTHOR) | |
|---|---|---|
| UPDATE DATE | 2005-11-22 14:18:11 | |
| TARGET USER | USER-C | |
| TARGET PC | PC-C | |
| TARGET DOCUMENT | FILE-C | |
| | OLD POLICY | NEW POLICY |
| BROWSE ACCESS LIMIT | - | UNLIMITED |
| BROWSE PERMISSION PERIOD | - | 2005-11-22 14:18:11 - 2005-11-30 23:59:59 |
| PRINT ACCESS LIMIT | - | NOT ALLOWED |
| PRINT PERMISSION PERIOD | - | - |
| WATERMARK OPTION | - | - |
| READER NOTIFICATION | - | NO |
| AUTHOR NOTIFICATION | - | YES (2005-11-29 00:00:00) |

149 POLICY LOG

| EDITOR | AUTO (IMPROPER ACCESS DETECTED) | |
|---|---|---|
| UPDATE DATE | 2005-11-25 17:23:18 | |
| TARGET USER | USER-C | |
| TARGET PC | PC-C | |
| TARGET DOCUMENT | FILE-C | |
| | OLD POLICY | NEW POLICY |
| BROWSE ACCESS LIMIT | UNLIMITED | NO BROWSING |
| BROWSE PERMISSION PERIOD | 2005-11-22 14:18:11 - 2005-11-30 23:59:59 | - |
| PRINT ACCESS LIMIT | NOT ALLOWED | NOT ALLOWED |
| PRINT PERMISSION PERIOD | - | - |
| WATERMARK OPTION | - | - |
| READER NOTIFICATION | NO | NO |
| AUTHOR NOTIFICATION | 2005-11-29 00:00:00 | 2005-11-29 00:00:00 |

FILE-A.doc

| DATE | USER | SOURCE PC | ACCESS EVENT |
|---|---|---|---|
| 2005-11-22 14:18:11 Access right defined | | | |
| *Browse Permission* | | | |
|     USER-A   valid until 2005-11-30 | | | Doc Read |
|     USER-B   valid until 2005-11-30 | | | Doc Unread |
|     USER-C   valid until 2005-11-30 | | | Doc Read |
| 2005-11-23 10:33:23 | USER-A | PC-A | Browse |
| 2005-11-25 17:23:17 | USER-C | PC-C | Browse |
| 2005-11-25 17:23:18 PC-C set to no-access status | | | |

(Search result for File-A.doc)

FIG. 19

FILE-B.doc

| DATE | USER | SOURCE PC | ACCESS EVENT |
|---|---|---|---|
| 2005-11-22 15:18:11 | | | Access right defined |
| *Browse Permission* | | | |
| | USER-A | | valid until 2005-11-30  Doc Read |
| | USER-B | | valid until 2005-11-25  Doc Read |
| 2005-11-24 22:19:15 | USER-B | PC-B | Browse |
| 2005-11-25 17:23:18 | | | PC-C set to no-access status |
| 2005-11-25 23:59:59 | | | USER-B permission expired |
| 2005-11-27 15:13:22 | USER-B | PC-B | Browse (Improper) |
| 2005-11-28 11:19:24 | USER-A | PC-A | Browse |

(Search result for File-B.doc)

FIG. 20

FILE-C.doc

| DATE | USER | SOURCE PC | ACCESS EVENT |
|------|------|-----------|--------------|

2005-11-22 15:18:11 Access right defined
*Browse Permission*
    USER-B  valid until 2005-11-30  Doc Read
    USER-C  valid until 2005-11-30  Doc Unread 2005-11-25 17:23:18 PC-C set to no-access status
2005-11-26 14:18:31  USER-B  PC-B    Browse
2005-11-29 11:24:18  USER-C  PC-C    Browse (Improper)

(Search result for File-C.doc)

FIG. 21

USER-A

| DATE | FILE | SOURCE PC | ACCESS EVENT | |
|---|---|---|---|---|
| 2005-11-22 15:18:11 | FILE-A | | Browse Permission (valid until 2005-11-30) | Doc Read |
| 2005-11-22 15:18:11 | FILE-B | | Browse Permission (valid until 2005-11-30) | Doc Read |
| 2005-11-23 10:33:23 | FILE-A | PC-A | Browse | |
| 2005-11-25 17:23:18 | | PC-C set to no-access status | | |
| 2005-11-28 11:19:24 | FILE-B | PC-A | Browse | |

(Search result for USER-A)

FIG. 22

USER-B

| DATE | FILE | SOURCE PC | ACCESS EVENT | |
|---|---|---|---|---|
| 2005-11-22 15:18:11 | FILE-A | Browse Permission (valid until 2005-11-30) | Doc Unread |
| 2005-11-22 15:18:11 | FILE-B | Browse Permission (valid until 2005-11-30) | Doc Read |
| 2005-11-22 15:18:11 | FILE-C | Browse Permission (valid until 2005-11-30) | Doc Read |
| 2005-11-24 22:19:15 | FILE-B | PC-B | Browse | |
| 2005-11-25 17:23:18 | PC-C set to no-access status | | | |
| 2005-11-25 23:59:59 | FILE-B permission expired | | | |
| 2005-11-27 15:13:22 | FILE-B | PC-B | Browse (Improper) | |
| 2005-11-26 14:18:31 | FILE-C | PC-B | Browse | |

(Search result for USER-B)

FIG. 23

USER-C

| DATE | FILE | SOURCE PC | ACCESS EVENT | |
|---|---|---|---|---|
| 2005-11-22 15:18:11 | FILE-A | Browse Permission (valid until 2005-11-30) | Doc Read |
| 2005-11-22 15:18:11 | FILE-C | Browse Permission (valid until 2005-11-30) | Doc Unread |
| 2005-11-25 17:23:17 | FILE-A | PC-C | Browse | |
| 2005-11-25 17:23:18 | PC-C set to no-access status | | | |
| 2005-11-29 11:24:18 | FILE-C | PC-C | Browse (Failed) | |

(Search result for USER-C)

| DATE | FILE | USER | ACCESS EVENT | |
|---|---|---|---|---|
| 2005-11-22 15:18:11 | FILE-A | Browse Permission | (valid until 2005-11-30) | Doc Read |
| 2005-11-22 15:18:11 | FILE-B | Browse Permission | (valid until 2005-11-30) | Doc Read |
| 2005-11-23 10:33:23 | FILE-A | USER-A | Browse | |
| 2005-11-28 11:19:24 | FILE-B | USER-A | Browse | |

(Search result for PC-A)

| DATE | FILE | USER | ACCESS EVENT | |
|---|---|---|---|---|
| 2005-11-22 15:18:11 | FILE-A | Browse Permission (valid until 2005-11-30) | Doc Unread |
| 2005-11-22 15:18:11 | FILE-B | Browse Permission (valid until 2005-11-30) | Doc Read |
| 2005-11-22 15:18:11 | FILE-C | Browse Permission (valid until 2005-11-30) | Doc Read |
| 2005-11-24 22:19:15 | FILE-B | USER-B | Browse |
| 2005-11-25 23:59:59 | FILE-B permission expired | | |
| 2005-11-27 15:13:22 | FILE-B | USER-B | Browse (Improper) |
| 2005-11-26 14:18:31 | FILE-C | USER-B | Browse |

(Search result for PC-B)

| DATE | FILE | USER | ACCESS EVENT | |
|---|---|---|---|---|
| 2005-11-22 15:18:11 | FILE-A | Browse Permission (valid until 2005-11-30) | Doc Read |
| 2005-11-22 15:18:11 | FILE-C | Browse Permission (valid until 2005-11-30) | Doc Read |
| 2005-11-25 17:23:17 | FILE-A | USER-C | Browse |
| 2005-11-25 17:23:18 | PC-C set to no-access status | | |
| 2005-11-29 11:24:18 | FILE-C | USER-C | Browse (Failed) |

(Search result for PC-C)

FIG. 27

METHOD, APPARATUS, AND COMPUTER PROGRAM FOR MANAGING ACCESS TO DOCUMENTS

CROSS-REFERENCE TO RELATED APPLICATIONS

This application is based upon and claims the benefits of priority from the prior Japanese Patent Application No. 2006-137961 filed on May 17, 2006, the entire contents of which are incorporated herein by reference.

BACKGROUND OF THE INVENTION

1. Field of the Invention

The present invention relates to a method, apparatus, and computer program for managing access to documents distributed to users. More particularly, the present invention relates to a method, apparatus, and computer program stored in a computer-readable medium which collect an access log of a document for managing access thereto.

2. Description of the Related Art

Documents created on a computer can easily be made available to multiple users on a network. Specifically, the author can make his/her documents open to other online users by uploading them to a file server on a network system. The file server offers document management functions including user access control. Some existing techniques permit a file server to store records of past access to documents. See, for example, Japanese Unexamined Patent Application Publication No. 2002-175300.

A file server acts as a document management platform, making it easy to detect an improper access to those documents. One drawback of this method is that availability of documents is limited to those who can access the server via a network. Another drawback is that the author is unable to manage how the document is handled on the recipient side once it is distributed to clients for browsing.

To solve the above shortcomings, some researchers have proposed a system in which the users are allowed to browse a distributed document only if their client computers are equipped with a prescribed document browsing function. Documents adapted to this management system are delivered from a mail server to users as an email attachment.

FIG. 32 shows an example of a conventional file management system. The author writes a document 941 on his/her client computer (hereafter, "client") 910. Before distributing the document 941 over the network, the author interacts with the document access management server 920 through the client 910 to establish an access policy 942 for access control of the document 941. This access policy 942 may be modified later in a similar way whenever the author needs it.

The access policy 942 is a set of parameters specifying access conditions for the document 941. For example, the access policy 942 includes a list of users who are eligible for browsing the document 941.

The document access management server 920 manages how the distributed document 941 is used at the recipient's end. Suppose, for example, that the user of a client 930 is attempting to read the document 941. The document access management server 920 thus sends a relevant access policy 942 to the client 930. The client 930 consults this access policy 942 to determine whether to permit access to the access policy 942, upon receipt of a user command requesting browse access to the document 941. The requesting user can view the document 941 on a monitor screen of the client 930 only when the access policy 942 permits it.

To record the above access to the document 941, the client 930 produces an access log 943, which contains, for example, the time stamp of browsing, user name, and other information in the case of browse access. The produced access log 943 is transferred from the client 930 to the document access management server 920 when, for example, the client 930 can reach the document access management server 920 for the first time after the access log 943 is produced. The document access management server 920 saves the received access log 943 in an access log database 921.

The access log database 921 accumulates access logs concerning the document 941, including records of access from other users. The access log database 921 also receives access logs of other documents. Besides storing a time stamp and user name of each access event, those access logs also provide information about whether each access attempt is valid (i.e., authorized by the corresponding access policy).

The above-described conventional method detects an improper access attempt to a document, but is unable to identify the reason why that access attempt was denied as being improper, since the conventional method relies on access logs alone. Most document management systems allow the access policies to be modified during operations. For this reason, one cannot find the exact reason of access denial by simply examining obtained access logs in comparison with the current access policies. From the viewpoint of access management, changing access policies in the middle of operations is problematic because it obscures some important information about user status, such as: who are eligible for browsing, who have actually read the document, who is leaving the document unread, and who have let their permission period expire.

SUMMARY OF THE INVENTION

In view of the foregoing, it is an object of the present invention to provide a computer program, apparatus, and method for managing access to documents, capable of identifying the exact events of document access on the basis of given access logs even when access policies are modified in the middle of operations.

To accomplish the above object, the present invention provides a computer-readable medium storing a program for managing access to documents. This program causes a computer to function as the following elements: (a) an access policy database storing access policies defining conditions for permitting access to documents; (b) a policy log database storing policy logs containing records of initial setup of the access policies and changes made to the access policies; (c) an access log database storing access logs containing records of access made to the documents; (d) an access policy manager that makes updates to the access policy database according to an access policy setup request received from a first client, the updates including addition of a new access policy to the access policy database and modification to an existing access policy in the access policy database; (e) a policy log collector that collects and stores policy log records in the policy log database to record the update made to the access policy database by the access policy manager; (f) an access policy sender, responsive to an access policy request from a second client, that retrieves from the access policy database an access policy of a document specified in the access policy request and sends the retrieved access policy back to the second client; (g) an access log collector that receives an access log of the specified document from the second client and stores the received access log in the access log database; and (h) a log searcher, responsive to a search condition given from a third client, that searches the policy log database to find policy log records that match with the given search condition, as well as the access log database to find access log records that match with the given search condition, and sends the found policy log records and access log records back to the third client.

Also, to accomplish the above object, the present invention provides an apparatus for managing access to documents. This apparatus has the following elements: (a) an access policy database storing access policies defining conditions for permitting access to documents; (b) a policy log database storing policy logs containing records of initial setup of the access policies and changes made to the access policies; (c) an access log database storing access logs containing records of access made to the documents; (d) an access policy manager that makes updates to the access policy database according to an access policy setup request received from a first client, the updates including addition of a new access policy to the access policy database and modification to an existing access policy in the access policy database; (e) a policy log collector that collects and stores policy log records in the policy log database to record the update made to the access policy database by the access policy manager; (f) an access policy sender, responsive to an access policy request from a second client, that retrieves from the access policy database an access policy of a document specified in the access policy request and sends the retrieved access policy back to the second client; (g) an access log collector that receives an access log of the specified document from the second client and stores the received access log in the access log database; and (h) a log searcher, responsive to a search condition given from a third client, that searches the policy log database to find policy log records that match with the given search condition, as well as the access log database to find access log records that match with the given search condition, and sends the found policy log records and access log records back to the third client.

Further, to accomplish the above object, the present invention provides a method of managing access to documents. This method includes the following steps: (a) providing an access policy database for storing access policies defining conditions for permitting access to documents; (b) providing a policy log database for storing policy logs containing records of initial setup of the access policies and changes made to the access policies; (c) providing an access log database storing access logs containing records of access made to the documents; (d) making updates to the access policy database according to an access policy setup request received from a first client, the updates including addition of a new access policy to the access policy database and modification to an existing access policy in the access policy database; (e) collecting and storing policy log records in the policy log database to record the updates made to the access policy database by the access policy manager; (f) upon receipt of an access policy request from a second client, retrieving from the access policy database an access policy of a document specified in the access policy request and sending the retrieved access policy back to the second client; (g) receiving an access log of the specified document from the second client and storing the received access log in the access log database; and (h) upon receipt of a search condition given from a third client, searching the policy log database to find policy log records that match with the given search condition, as well as the access log database to find access log records that match with the given search condition, and sending the found policy log records and access log records back to the third client.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example data structure of an access policy database.

FIG. 9 shows an example data structure of an access log database.

FIG. 11 shows an example of a policy log in the case where an access policy has been changed automatically.

FIG. 19 shows a search result for FILE-A.

FIG. 20 shows a search result for FILE-B.

FIG. 21 shows a search result for FILE-C.

FIG. 22 shows a search result for USER-A.

FIG. 23 shows a search result for USER-B.

FIG. 24 shows a search result for USER-C.

FIG. 25 shows a search result for PC-A.

FIG. 26 shows a search result for PC-B.

FIG. 27 shows a search result for PC-C.

DESCRIPTION OF THE PREFERRED EMBODIMENTS

Figure 1:
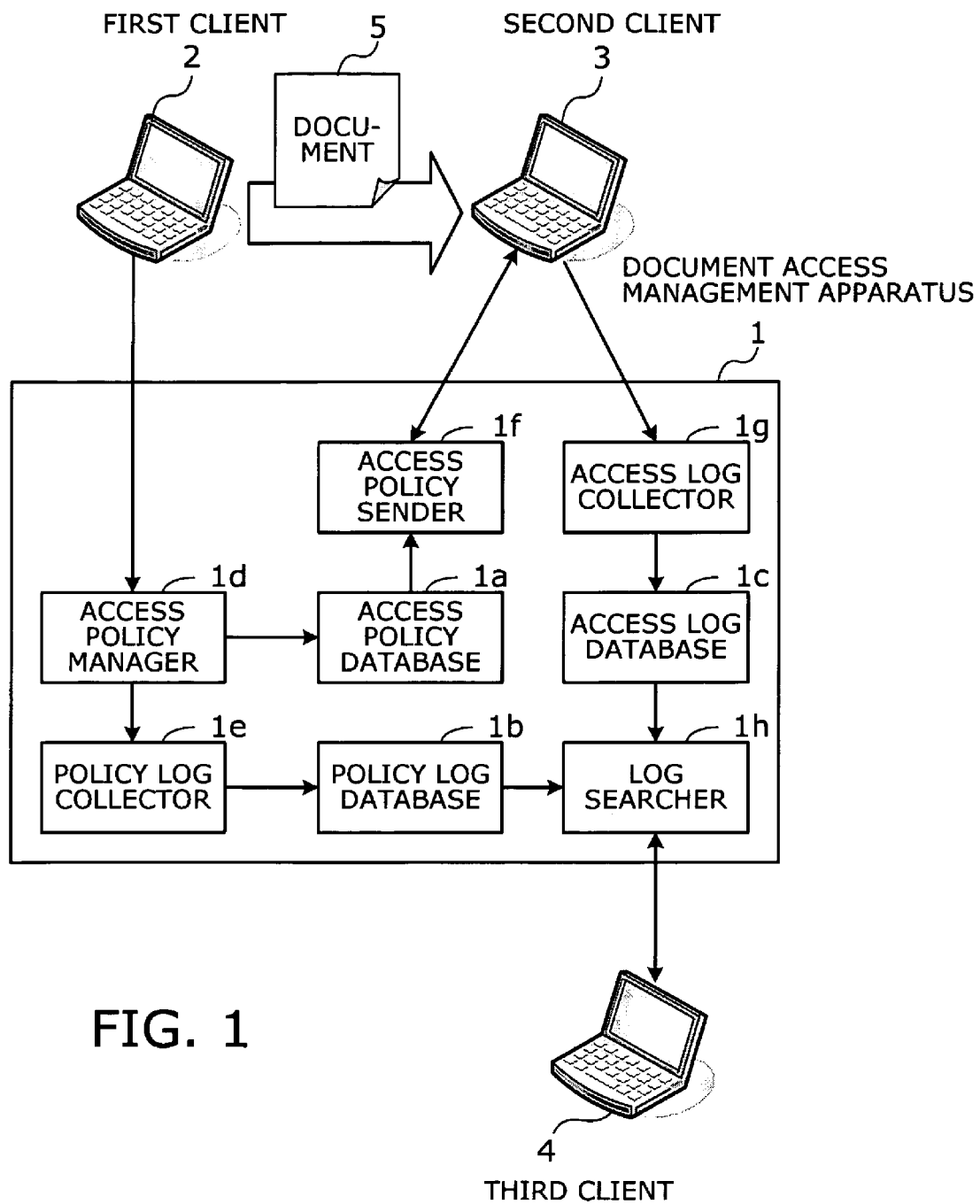
FIG. 1 gives an overview of an embodiment of the present invention.

Preferred embodiments of the present invention will be described below with reference to the accompanying drawings, wherein like reference numerals refer to like elements throughout.

FIG. 1 gives an overview of an embodiment of the present invention. Illustrated in FIG. 1 is a document access management apparatus 1 according to the present invention, to which a first client 2, a second client 3, and a third client 4 are connected. The first client 2 supplies the second client 3 with a document 5. The second client 3 has the function of collecting an access log of the document 5, in addition to an access function to the document 5 for browsing. The second client 3 uploads the collected access log to the document access management apparatus 1 at an appropriate time (e.g., immediately after making access to the document 5, or when the document access management apparatus 1 becomes available for communication).

For management of access to the document 5 and other documents (not shown), the document access management apparatus 1 has the following elements: an access policy database 1a, a policy log database 1b, an access log database 1c, an access policy manager 1d, a policy log collector 1e, an access policy sender 1f, an access log collector 1g, and a log searcher 1h. These elements provide the functions described below.

The access policy database 1a stores access policies defining conditions for permitting access to documents. Specifically, an access policy defines, for example, users and clients that are allowed to make access to a specific document.

The policy log database 1b stores policy logs containing records of initial setup of the access policies and changes made to the access policies. Specifically, a policy log contains records of every update made to a specific access policy, including both old and new policy parameters.

The access log database 1c stores an access log containing records of access made to the documents. Specifically, this access log contains, for example, time stamps of access, the names of documents accessed, and information about validity of access.

The access policy manager 1d updates the access policy database 1a according to an access policy setup request received from the first client 2. Such updates include addition of a new access policy to the access policy database 1a and modification to an existing access policy in the access policy database 1a. Also, in the event of invalidity (e.g., tampering) detected in an access log, the access policy manager 1d would automatically modify the access policy associated with the source of that invalid access log, so that the source client will no longer be able to make access to the document.

The policy log collector 1e collects and stores policy log records-in the policy log database 1b to record every update made to the access policy database 1a by the access policy manager 1d. In addition to recording updates made in response to the aforementioned access policy setup request, the policy log may also contain modifications that the access policy manager 1d would make automatically to the access policy in the event of improper access or the like.

The access policy sender 1f is responsive to an access policy request from the second client 3. That is, the access policy sender 1f retrieves from the access policy database 1a an access policy of a document 5 specified in that access policy request and sends the retrieved access policy back to the second client 3. The second client 3 can make access to the document 5 if the retrieved access policy permits it. An access log is then created in the second client 3 to record its access behavior as to the document 5. This access log would include a record indicating an improper access if the user of the second client 3 requested what the access policy does not allow him/her to do.

The access log collector 1g receives the above access log of the specified document 5 from the second client 3 and stores the received access log in the access log database 1c. At that time, the access log collector 1g checks whether there is no tampering with the received access log. This is accomplished by, for example, verifying a digital signature that the second client 3 has added to the access log. The digital signature permits the access log collector 1g to determine whether the access log has undergone any improper data manipulation.

The log searcher 1h, responsive to a search condition given from the third client 4, searches the policy log database 1b to find policy log records that match with the given search condition, as well as searching the access log database 1c to find access log records that match with the given search condition. The log searcher 1h then sends the found-policy and access log records back to the third client 4.

The above document access management apparatus 1 operates as follows. Upon receipt of an access policy setup request from the first client 2, the access policy manager 1d adds a new access policy to the access policy database 1a or modifies an existing access policy in the access policy database 1a according to the request. The policy log collector 1e stores the records of such a new access policy or modified existing access policy in the policy log database 1b. When an access policy request for a document 5 is received from the second client 3, the access policy sender 1f retrieves the requested access policy from the access policy database 1a and sends it back to the requesting second client 3. Afterwards the access log collector 1g receives an access log for the document 5 from the second client 3 and saves it in the access log database 1c. When the third client 4 issues a log request with a specific search keyword, the log searcher 1h searches the policy log database 1b to find policy log records that match the received search condition. The log searcher 1h also searches the access log database 1c to find access log records that match with the received search condition. The found log records are then sent to the requesting third client 4.

As can be seen from the above explanation, the document access management apparatus 1 of the present embodiment is designed to produce policy logs to record every update made to the access policy and uses them together with access logs when requested to retrieve log records. That is, the document access management apparatus 1 searches not only access logs, but also policy logs, thus making it possible to identify more than what the access logs can tell.

Think of, for example, a user who was initially allowed to browse a document 5, and suppose that his access right is removed because of a change in the corresponding access policy. The user may attempt to browse the document 5, but this time the access will be denied as being invalid. The access log in this case would only show the fact that the user's access attempt to the document 5 was denied at a particular time. The policy log, however, provides further information about the reason why the user was denied. In the present example, the policy log suggests that the denial was caused by a change in the access policy.

First Embodiment

Figure 2:
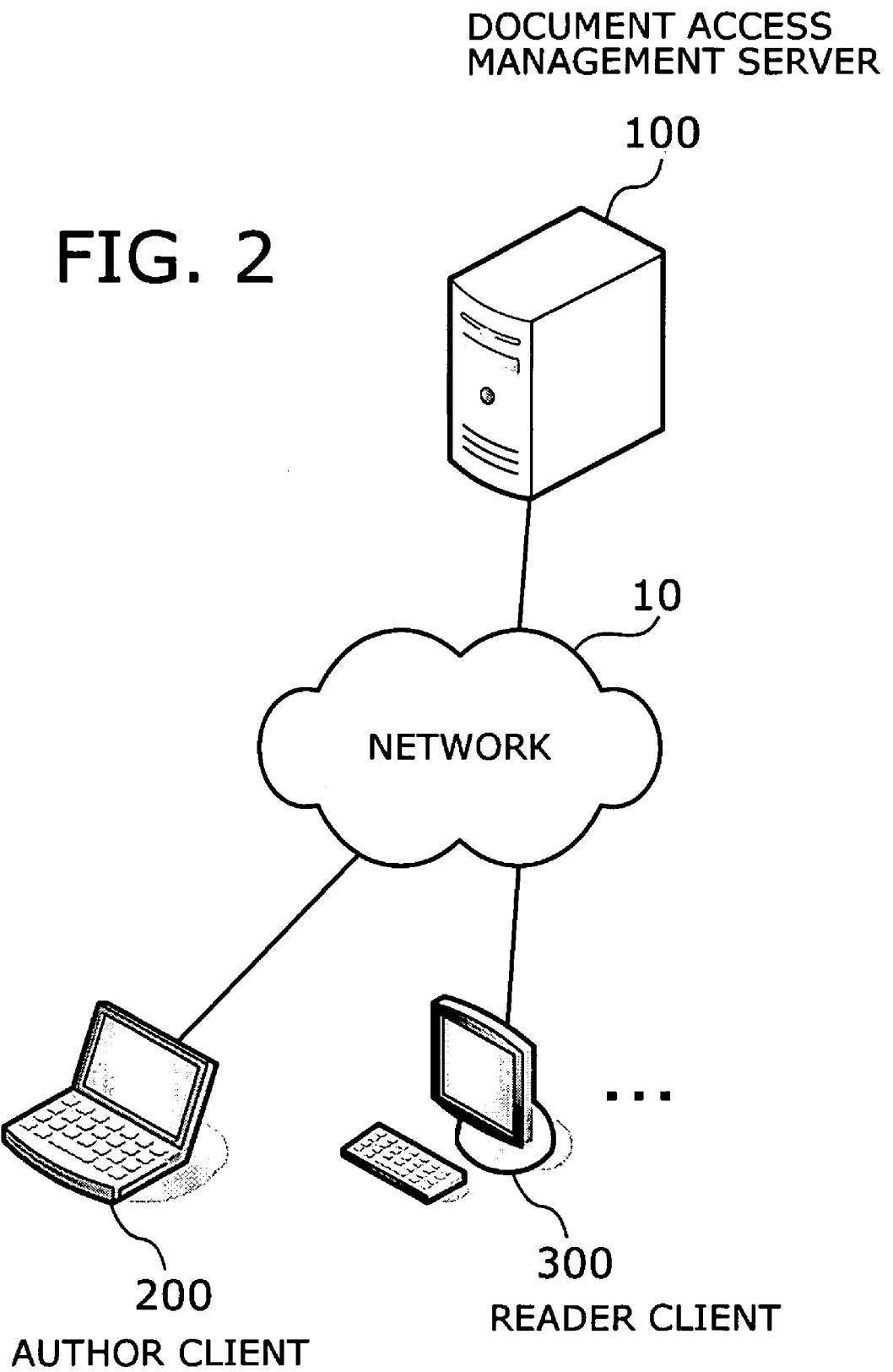
FIG. 2 is a block diagram of a system in which the present invention is embodied.

This section will describe a more specific embodiment of the present invention. FIG. 2 is a block diagram of a system according to a first embodiment of the invention. The first embodiment assumes that a document access management server 100 is connected to a plurality of clients on via a network 10. While more clients may be connected to the document access management server 100, FIG. 2 shows only two such clients, 200 and 300, for the purpose of simplicity. The document access management server 100 manages access to documents exchanged between those clients 200 and 300. The users operate their respective clients 200 and 300 to create, distribute, and browse documents. Suppose, for example, that a document created at one client 200 (author client) is supplied to another client 300 (reader client). When this document is browsed at the reader client 300, an access log is created in that client 300 to record the browsing event. The access log is then collected by the document access management server 100 through the network 10.

Figure 3:
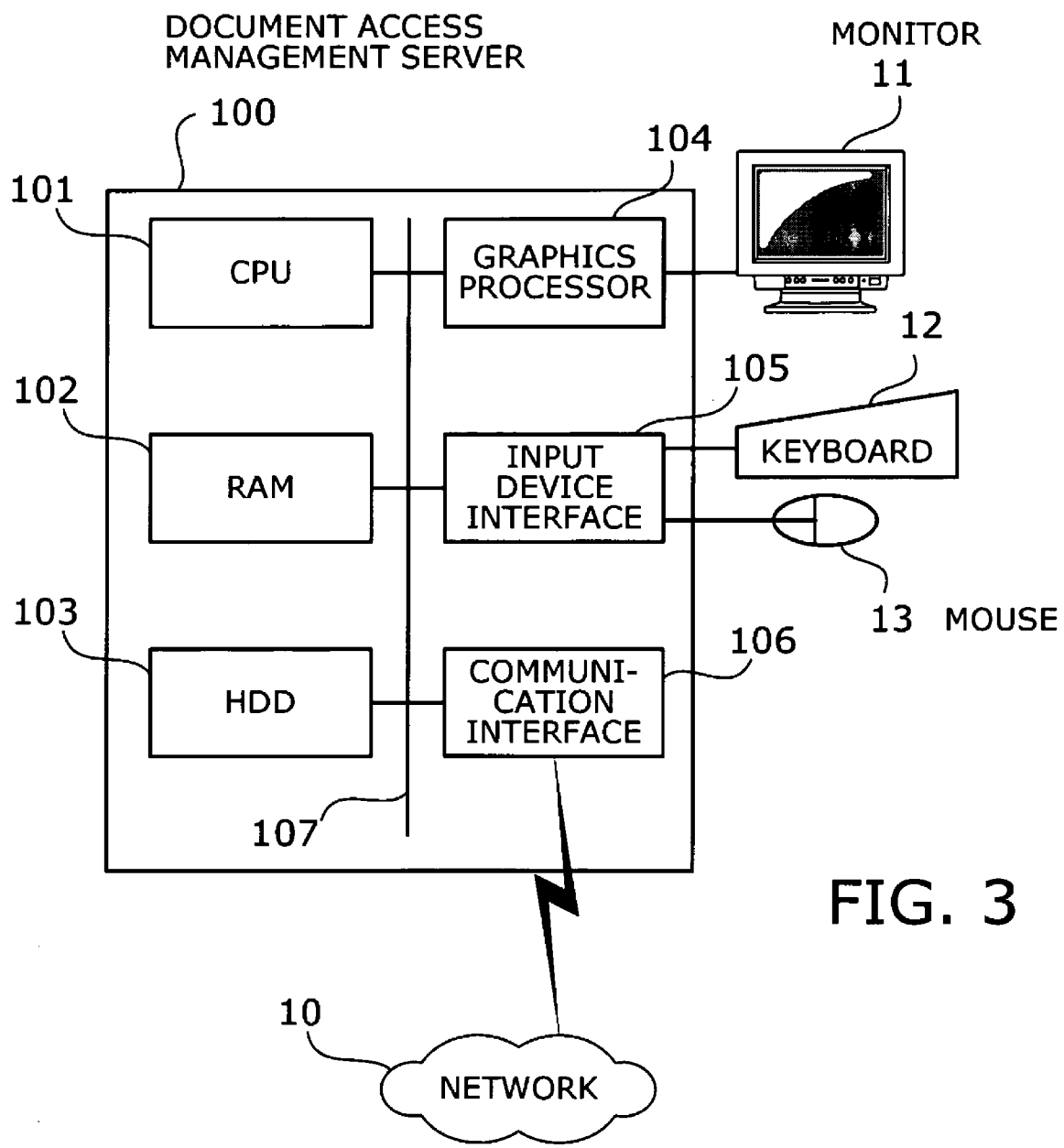
FIG. 3 shows an example hardware configuration of a document access management server according to the present embodiment.

The clients and server in the system of FIG. 2 are computers with appropriate hardware configuration. Specifically, FIG. 3 shows an example hardware configuration of the document access management server 100. The illustrated document access management server 100 is formed from the following elements: a CPU 101, a random access memory (RAM) 102, a hard disk drive (HDD) 103, a graphics processor 104, an input device interface 105, and a communication interface 106.

The CPU 101 controls the entire computer system, interacting with other elements via a bus 107. The RAM 102 serves as temporary storage for the whole or part of operating system (OS) programs and application programs that the CPU 101 executes, in addition to other various data objects manipulated at runtime. The HDD 103 stores program files of the operating system and various applications.

The graphics processor 104 produces video images in accordance with drawing commands from the CPU 101 and displays them on the screen of a monitor 11 coupled thereto. The input device interface 105 is used to receive signals from external input devices, such as a keyboard 12 and a mouse 13. Those input signals are supplied to the CPU 101 via the bus 107. The communication interface 106 is connected to a network 10, allowing the CPU 101 to exchange data with other computers (not shown) on the network 10.

Figure 4:
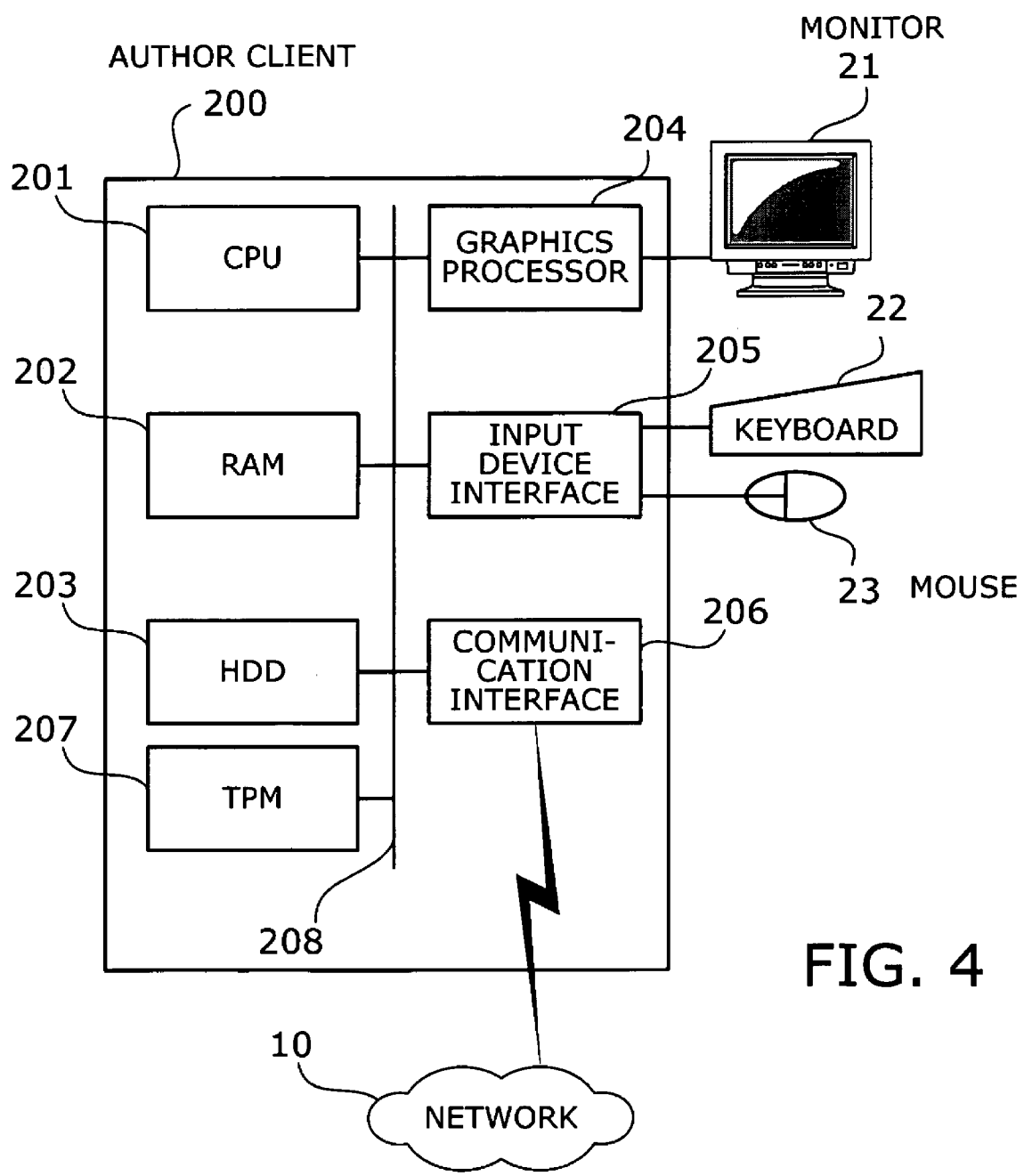
FIG. 4 shows an example hardware configuration of a client according to the present embodiment.

FIG. 4 shows an example hardware configuration of the author client 200 according to the present embodiment. The illustrated author client 200 is formed from the following elements: a CPU 201, a random access memory (RAM) 202, a hard disk drive (HDD) 203, a graphics processor 204, an input device interface 205, a communication interface 206, and a trusted platform module (TPM) 207. The CPU 201 controls the entire computer system, interacting with other elements via a bus 208. The RAM 202 serves as temporary storage for the whole or part of operating system (OS) programs and application programs that the CPU 201 executes, in addition to other various data objects manipulated at runtime. The HDD 203 stores program files of the operating system and various applications.

The graphics processor 204 produces video images in accordance with drawing commands from the CPU 201 and displays them on the screen of a monitor 21 coupled thereto. The input device interface 205 is used to receive signals from external input devices, such as a keyboard 22 and a mouse 23. Those input signals are supplied to the CPU 201 via the bus 208. The network interface 206 is connected to a network 10, allowing the CPU 201 to exchange data with other computers (not shown) on the network 10.

The TPM 207 is a semiconductor chip that implements functions for secure software environments defined by the Trusted Computing Group (TCG). The TPM 207 offers the following features:
storing hashes to protect software programs from tampering
creating and keeping a private key in the TPM itself to ensure its own authenticity
protected memory for storing a private key safely
secure and correct processing for public-key cryptography, random number generation, and hash calculation
The TPM 207 uses those features to produce a key for document encryption and generate a signature for access logs.

The above-described computers serve as hardware platforms for realizing the processing functions of the present and other embodiments of the invention. While FIG. 4 shows the author client 200 for illustrative purposes, the same hardware architecture can be applied to the reader client 300 and other clients.

Figure 5:
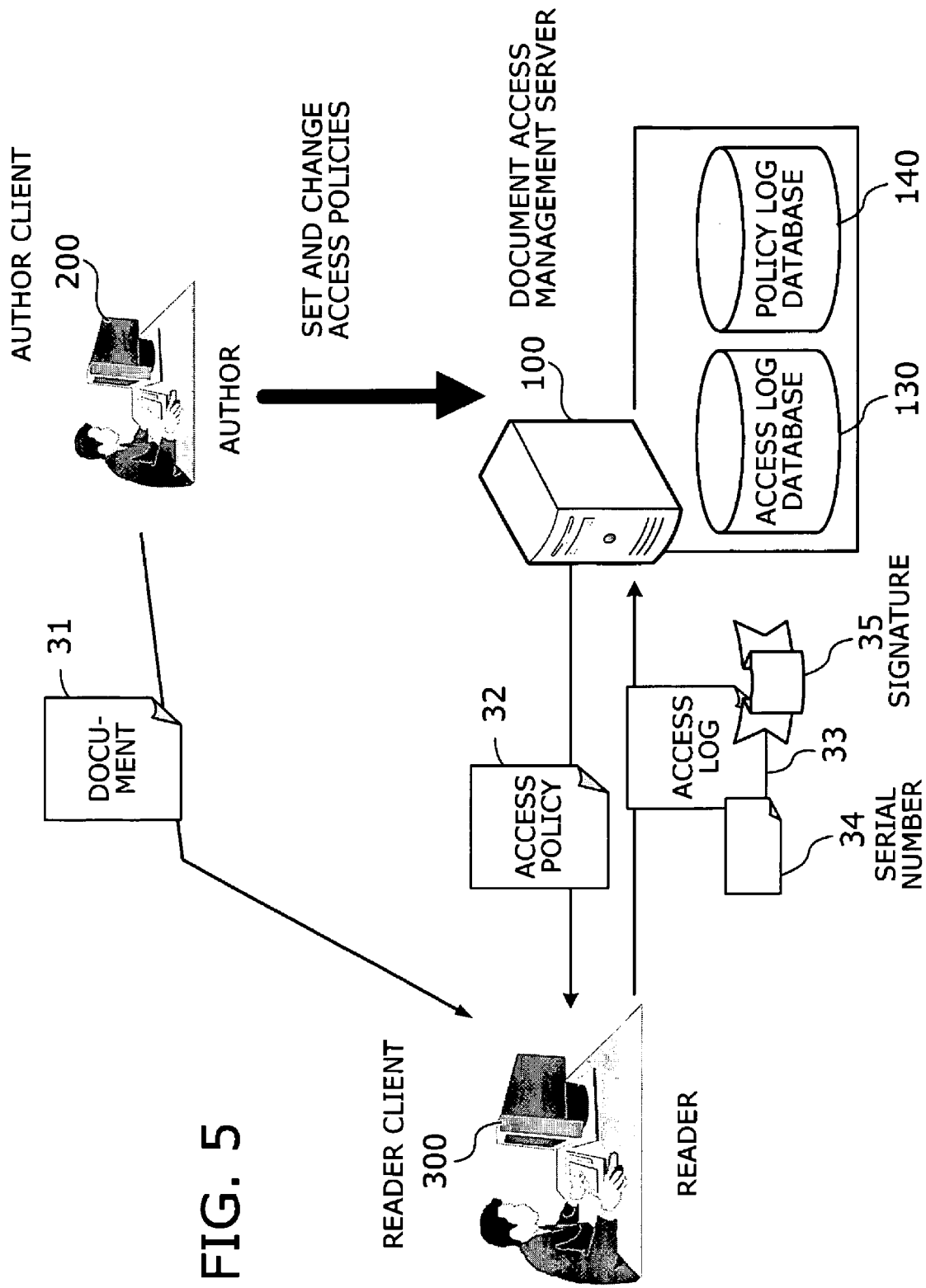
FIG. 5 gives an overview of how the system of the present embodiment operates.

FIG. 5 gives an overview of how the system of the first embodiment operates. The author (the user of a client 200) creates and distributes a document 31 over the network. The document 31 is encrypted at the author client 200 before it is distributed to other clients in the form of, for example, a file attachment of electronic mail. A reader client 300 keeps a key in its TPM to decode such encrypted document files.

When distributing the document 31, the author interacts with the document access management server 100 through his/her client 200 to define an access policy 32 for the purpose of managing access to the document 31. The access policy 32 is a set of conditions to be applied to each user's access to the document 31. For example, the access policy 32 may include a list of users who are eligible for browsing the document 31.

The document access management server 100 saves a log of the created access policy 32 in its policy log database 140. The document access management server 100 also updates the log in the policy log database 140 when the access policy 32 is modified.

Suppose now that the reader enters a browsing command to his/her client 300 in an attempt to read the document 31. Then the reader client 300 requests the document access management server 100 to provide an access policy 32 for that document 31. Accordingly the document access management server 100 retrieves the access policy 32 and sends it to the requesting reader client 300. The reader client 300 determines whether the access policy 32 permits the requesting reader to browse the document 31. If the access policy 32 permits it, the reader client 300 decrypts the document 31 and outputs it on a monitor screen.

At the time of decryption and display of the document 31, the reader client 300 creates an access log 33 to record that event. This access log 33 contains, for example, a browse time stamp and a user name. The reader client 300 uploads the access log 33 to the document access management server 100 after affixing thereto a serial number 34 and a signature 35. The serial number 34 is an incremental number that increases each time an access log is sent out. The signature 35 is created by calculating a hash from the access log 33 and its serial number 34 and then encrypting it with a private key held in the TPM 207 (FIG. 4). The reader client 300 sends the access log 33 to the document access management server 100 when, for example, it can connect with the document access management server 100 via the network for the first time after the access log 33 is created.

Upon receipt of the access log 33, the document access management server 100 verifies the authenticity of the access log 33 by examining its serial number 34 and signature 35. If the result is positive, the document access management server 100 saves the received access log 33 in its access log database 130.

The records of every update made to each access policy are accumulated in the policy log database 140 in the way described above, as are access log records in the access log database 130. The author of the document 31 can search those log records in the access log database 130 and policy log database 140 through the author client 200, which enables him/her to see how the document 31 has been accessed by other users.

Elements of Server and Clients

Figure 6:
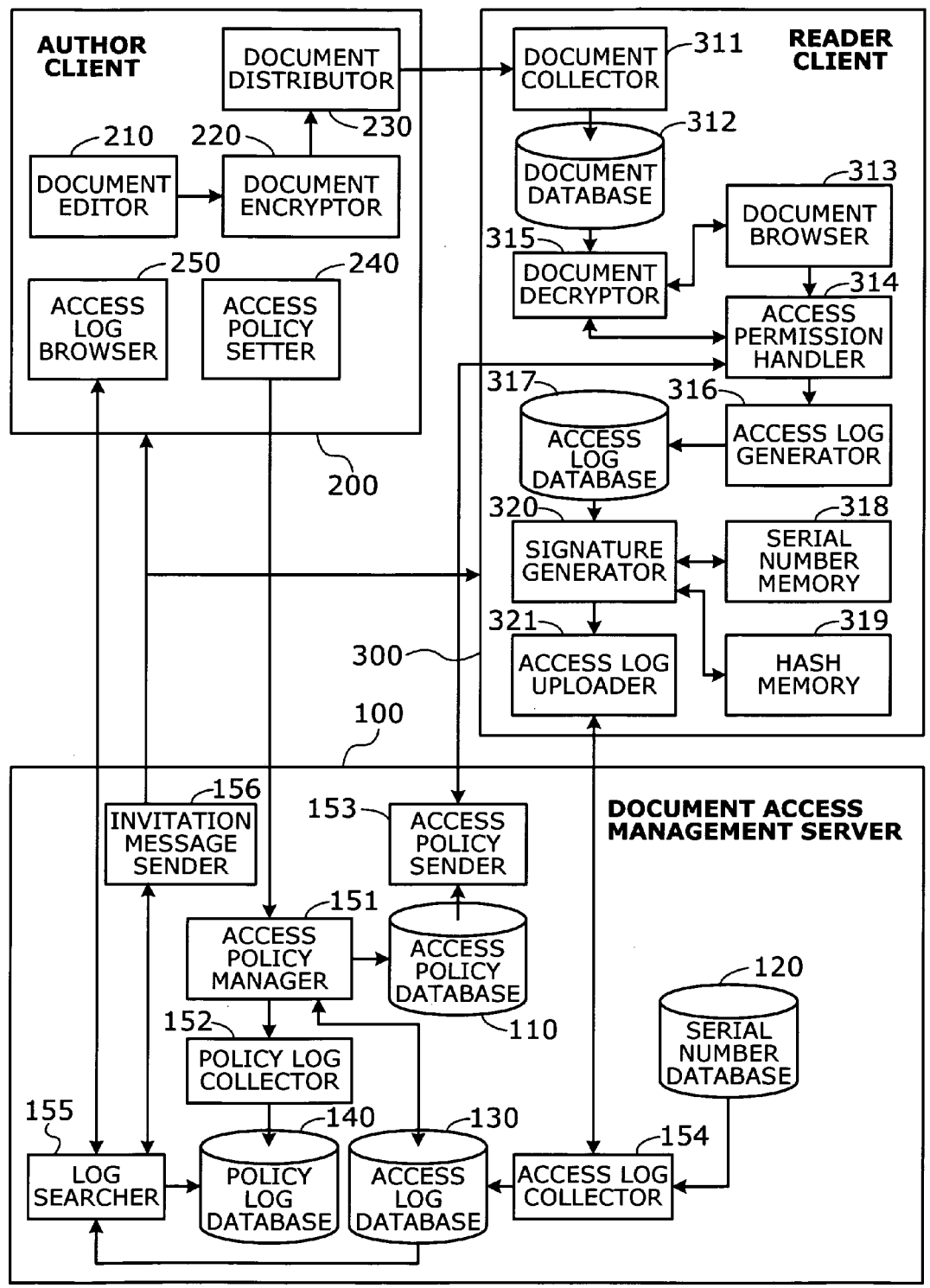
FIG. 6 is a functional block diagram of a first embodiment of the invention.

To implement the operations described above, the document access management server 100 and clients 200 and 300 are required to have various functions described below. FIG. 6 is a functional block diagram of the first embodiment of the invention. As can be seen, the author client 200 has the following elements: a document editor 210, a document encryptor 220, a document distributor 230, an access policy setter 240, and an access log browser 250.

The document editor 210 allows the author to write a document 31 for distribution to other users. One typical implementation of this document editor 210 is word processors. The document encryptor 220 encrypts the document that the author has created with the document editor 210. This encryption process involves an appropriate encryption key, so that the reader client 300 can decode the encrypted file by using a cryptographic key stored in its TPM. Specifically, the reader client 300 keeps a private key in its secure storage, and the document encryptor 220 uses a public key associated with that private key. The document distributor 230 sends the encrypted document 31 to the reader client 300 over the network 10 (FIG. 2) in the form of, for example, an email attachment.

The access policy setter 240 creates an access policy 32 for the document 31 in response to a request from the author and registers the created access policy 32 with the document access management server 100. The access policy setter 240 may also send the document access management server 100 a request for modifying the access policy 32 when a command for access policy modification is received from the author.

The access log browser 250 sends the document access management server 100 a request for searching an access log in response to a search command from the author. When a search result is received from the document access management server 100, the access log browser 250 displays the result on a monitor screen.

The reader client 300 has the following elements: a document collector 311, a document database 312, a document browser 313, an access permission handler 314, a document decryptor 315, an access log generator 316, an access log database 317, a serial number memory 318, a hash memory 319, a signature generator 320, and an access log uploader 321.

The document collector 311 receives a document 31 from the author client 200 over the network 10. More specifically, the document 31 may be distributed as an email attachment, in which case the document collector 311 receives the document 31 via a mail server (not shown in FIG. 6). The received document 31 is then saved into the document database 312. The document database 312 is a part of the HDD space, for example, allocated for storing document files.

The document browser 313 displays the received document 31 in response to a command from the reader sitting at the reader client 300. More specifically, the reader specifies the document 31 for browsing, which causes the document browser 313 to ask the access permission handler 314 to determine whether the requesting reader is allowed to have access to the document 31. If the access permission handler 314 permits his/her access to the document 31, then the document browser 313 receives a decrypted version of the document 31 from the document decryptor 315 and outputs it on a monitor screen.

The access permission handler 314 determines whether to permit access to a specified document 31, upon request from the document browser 313. More specifically, when an inquiry about access permission is received, the access permission handler 314 issues an access policy request to the document access management server 100. This request causes the document access management server 100 to retrieve and return a relevant access policy 32. The access permission handler 314 then examines information about the reader client 300 and its user, as well as the date and time of access, in the light of the provided access policy 32, thereby determining whether the requesting user is eligible for making access to the document 31. The user information may be obtained as part of account information that the user enters when he/she logs in to the reader client 300. If the user information and other items satisfy the conditions specified in the access policy 32, the access permission handler 314 grants permission to the requesting user to have access to the document 31. If not, the access permission handler 314 denies access to the document 31.

As an alternative configuration, the reader client 300 may be configured to fetch access policies beforehand from the document access management server 100. More specifically, the access permission handler 314 communicates with the document access management server 100 at an appropriate time to receive all access policies that are supposed to be applied to the reader client 300. The received access policies are then saved in an HDD or other local storage. Upon receipt of an inquiry about access permission, the access permission handler 314 consults the stored policy files to determine whether to accept or deny the access request at hand. This configuration enables the user of the client 300 to browse a document 31 even if the client 300 is unable to communicate with the document access management server 100 immediately.

The contents of an access policy in the document access management server 100 are subject to update and modification. For this reason, a valid period is set to each access policy that is previously fetched and stored in the reader client 300. For example, an access policy is supposed to be valid for 24 hours from the time it is fetched. The access permission handler 314 uses an access policy to determine whether to permit or deny an access request if that policy is valid. When the valid period expires, the access permission handler 314 requests the document access management server 100 to provide the current version of that access policy. If a new version is not available in the document access management server 100, the access request to the document 31 has to be denied. This mechanism prevents an old policy from being used for a long time without update.

The document decryptor 315 reads a document 31 out of the document database 312 and decrypts it when the access request to that document 31 is granted. The decryption key for this purpose is retrieved from TPM. The document decryptor 315 then sends the decrypted document 31 to the document browser 313.

The access log generator 316 keeps track of what the access permission handler 314 determines about access to the document 31, thus creating an access log. This access log contains access time stamps, user names, and other information. The access log generator 316 stores the created access log in the access log database 317.

The access log database 317 is a part of the HDD space, for example, allocated for storing access log files. The access log database 317 receives and maintains a plurality of access logs until they are uploaded to the document access management server 100. Once uploaded, those access logs in the access log database 317 are deleted by the signature generator 320.

The serial number memory 318 is where the latest serial number is stored. According to the present embodiment, a part of a TPM memory space is assigned for this purpose. The hash memory 319 is where the most recently produced hash is stored. According to the present embodiment, a part of a TPM memory space is assigned for this purpose. The signature generator 320 generates a signature for each access log in the access log database 317 when the document access management server 100 is found reachable from the access log uploader 321.

More specifically, the signature generator 320 operates as follows. When an, access log is entered in the access log database 317 for the first time, the signature generator 320 produces a hash from that first access log according to a prescribed algorithm. The produced hash is saved into the hash memory 319. Then each time a new access log is produced and stored in the access log database 317, the signature generator 320 adds the hash in the hash memory 319 to that new access log. The signature generator 320 produces a new hash according to the prescribed algorithm and updates the hash memory 319 with the new has value.

After generating a hash for a given access log, the signature generator 320 determines whether the document access management server 100 is reachable. If it is reachable, the signature generator 320 combines the serial number stored in the serial number memory 318 with the hash in the hash memory 319 and produces a new hash from that data according to the prescribed algorithm. The signature generator 320 then encrypts this hash with an encryption key kept in the TPM, for use as a signature of access logs. The signature generator 320 retrieves all access logs in the access log database 317 and supplies them to the access log uploader 321, combining them with a signature and a serial number. The access log uploader 321 transmits those access logs to the document access management server 100, together with their serial number and signature.

The document access management server 100 has the following elements: an access policy database 110, a serial number database 120, an access log database 130, a policy log database 140, an access policy manager 151, a policy log collector 152, an access policy sender 153, an access log collector 154, a log searcher 155, and an invitation message sender 156.

The access policy database 110 is, for example, a part of the HDD 103 allocated for storing access policies of documents 31. The serial number database 120 is, for example, another part of the HDD 103 allocated for storing the latest serial number attached to each client's access logs. The access log database 130 is, for example, yet another part of the HDD 103 allocated for storing access logs of each document. The policy log database 140 is, for example, still another part of the HDD 103 allocated for storing policy logs containing records of new access policies and changes made to existing access policies.

The access policy manager 151 stores a new access policy 32 of a document 31 in the access policy database 110 when it is received from the author client 200. The access policy manager 151 also changes the access policy 32 in the access policy database 110 when so requested by the author client 200. The access policy manager 151 is further responsible for checking access logs stored in the access log database 130 to detect an improper access to the document 31. In the case where an access attempt satisfies a predetermined condition indicating a lack of eligibility, the access policy manager 151 automatically changes the corresponding access policy in the access policy database 110 such that the source client or the user of that client will be under tighter conditions to restrict access to other documents.

The policy log collector 152 monitors interactions between the access policy manager 151 and the access policy database 110. The policy log collector 152 compiles a policy log from the monitoring results and saves it into the policy log database 140.

The access policy sender 153 is responsive to an access policy request for a specified document 31. When such a request is received from the reader client 300, the access policy sender 153 retrieves a relevant access policy from the access policy database 110 and sends it back to the reader client 300.

The access log collector 154 communicates with the reader client 300 when it is possible, so as to receive an access log together with its serial number and signature. Suppose that the access log collector 154 has received an access log 33 for a document 31. The access log collector 154 then consults the serial number database 120 to retrieve a serial number corresponding to the reader client 300. The access log collector 154 uses this serial number to verify the serial number and signature of the received access log 33. More specifically, the access log collector 154 first checks whether the serial number of the access log 33 is the same as that retrieved from the serial number database 120. The access log collector 154 then decodes the received signature with a prescribed key, thereby obtaining a hash. The access log collector 154 calculates a hash from the access log 33 received from the reader client 300 and the serial number retrieved from the serial number database 120. The algorithm used in this hash generation process is the same as what the signature generator 320 in the reader client 300 uses to generate hashes.

Clients may send two or more access logs to the access log collector 154. In that case, the access log collector 154 first selects an access log with the oldest time stamp to calculate a hash. The access log collector 154 then selects the second to the oldest access log, adds the above hash to the selected access log, and calculates another hash from the resulting access log data. The access log collector 154 repeats this until a hash is calculated from the latest access log. With this hash and the serial number in the serial number database 120, the access log collector 154 calculates yet another hash for the purpose of comparison.

The access log collector 154 now compares the calculated hash with the signature-derived hash, thereby verifying the signature. If the signature is found valid, it means that the continuity of serial numbers is verified. In other words, the access log collector 154 has successfully received every access log up to the moment. After verifying the signature, the access log collector 154 updates the serial number database 120 by incrementing the serial number associated with the document 31 and saves the received access log 33 in the access log database 130.

The log searcher 155 searches access logs in the access log database 130, as well as policy logs in the policy log database 140, in response to a search request from the author client 200. The log searcher 155 sends retrieved access log records and policy log records to the requesting client 200.

The invitation message sender 156 collects information about users who are eligible to read a document but have not browsed it. The invitation message sender 156 sends a message to invite those eligible users to browse the document. The invitation message sender 156 also provides the author of the document with a list of users who have not browsed the document. Such invitations and user lists are delivered through email facilities.

Database Structure

This section describes the structure of data stored in the access policy database 110, serial number database 120, access log database 130, and policy log database 140.

FIG. 7 shows an example data structure of the access policy database 110. The illustrated access policy database 110 contains a plurality of access policies 111, 112, 113, and so on, each of which has the following data fields: "Document Author," "Target User," "Target PC," "Target Document," "Browse Access Limit," "Browse Permission Period," "Print Access Limit," "Print Permission Period," "Watermark Option," "Reader Invitation," and "Author Notification."

The document author field shows the user name of the author of a document being managed. The target user field contains the name of a user who is eligible to make access to the managed document. The target PC field contains a unique identifier of a client being managed. The target document field contains a document name that uniquely identifies the managed document. The browse access limit field contains a number specifying how many times the user is allowed to browse the managed document. The browse permission period gives a period during which the user is allowed to browse the managed document. The print access limit field contains a number specifying how many copies of the managed document the user is allowed to print. The print permission period gives a period during which the user is allowed to print the managed document. The watermark option field specifies whether to add an electronic watermark to the document when printing it. When enabled, this watermark option inserts an image (watermark) to a printed copy of the document so that some particular information can be retrieved from the resulting copy by performing an appropriate image processing. The reader invitation field specifies a date limit that triggers the system to send an invitation message to users who have not read the document being managed. This invitation is optional, and thus the reader invitation field may instead contain a code indicating that the option is not enabled. The author notification field gives a date limit that triggers the system to send a message to notify the document author of the presence of users, if any, who have not read the document. This notification function is also optional, and thus the author notification field may instead contain a code indicating that the option is not enabled.

Figure 8:
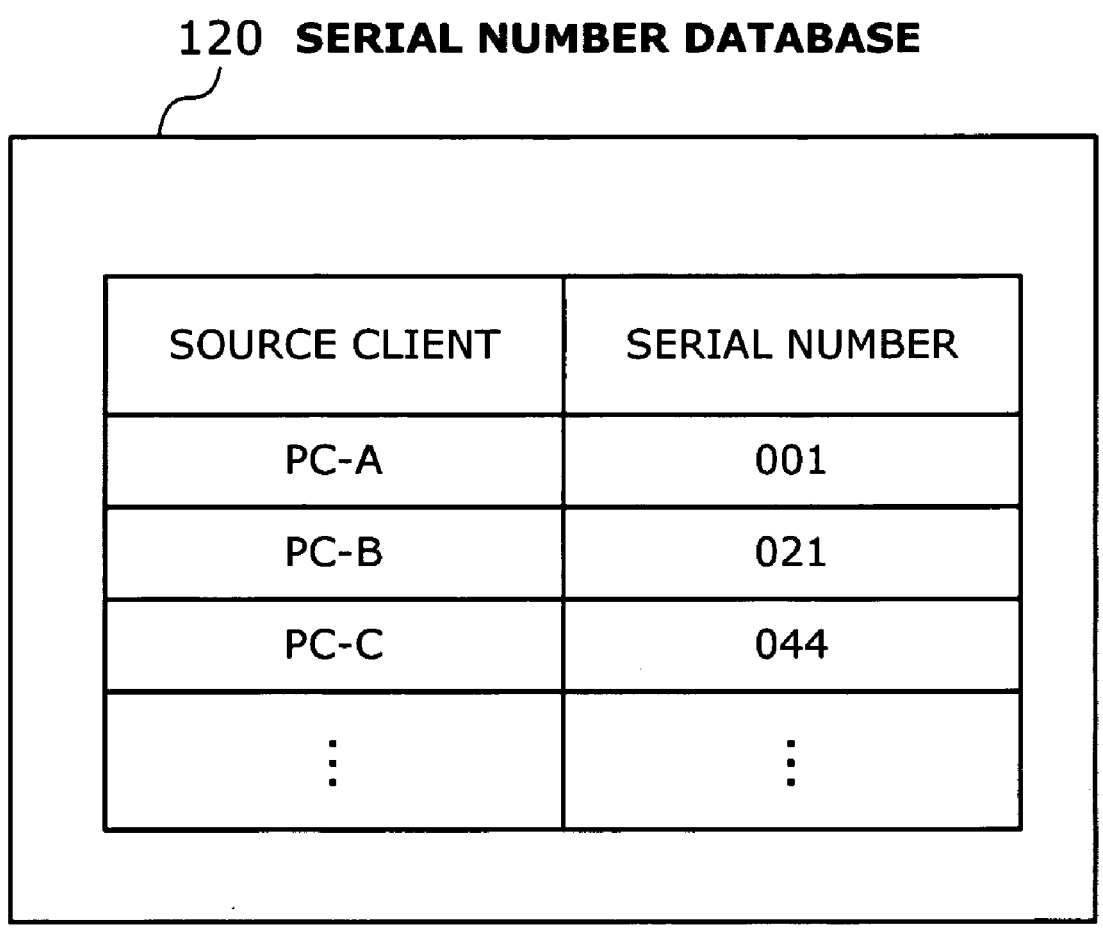
FIG. 8 shows an example data structure of a serial number memory.

FIG. 8 shows an example data structure of the serial number database 120. The illustrated data structure is formed from the following two data fields: "Source Client" and "Serial Number." The source client field contains the name of a client that has made access to a document being managed. The serial number field contains a serial number that is supposed to be given to the next-coming access log from the corresponding source client.

FIG. 9 shows an example data structure of the access log database 130. The illustrated data structure has the following data fields: "Date," "File Name," "User," "Source Client," and "Access Event." Each row (i.e., each set of associated data fields) of this access log database 130 constitutes a single access log record.

The date field contains a time stamp showing when the managed document was accessed. The file name field contains the name of a document file that was accessed, and the user field shows who made that access. The source client field contains the name of the client used for the access. The access event field shows what kind of access was made. For example, the field is set to "BROWSE" to indicate that the corresponding document was browsed. The access event field would be marked "IMPROPER" in the case the access attempt was denied at the client.

Figure 10:
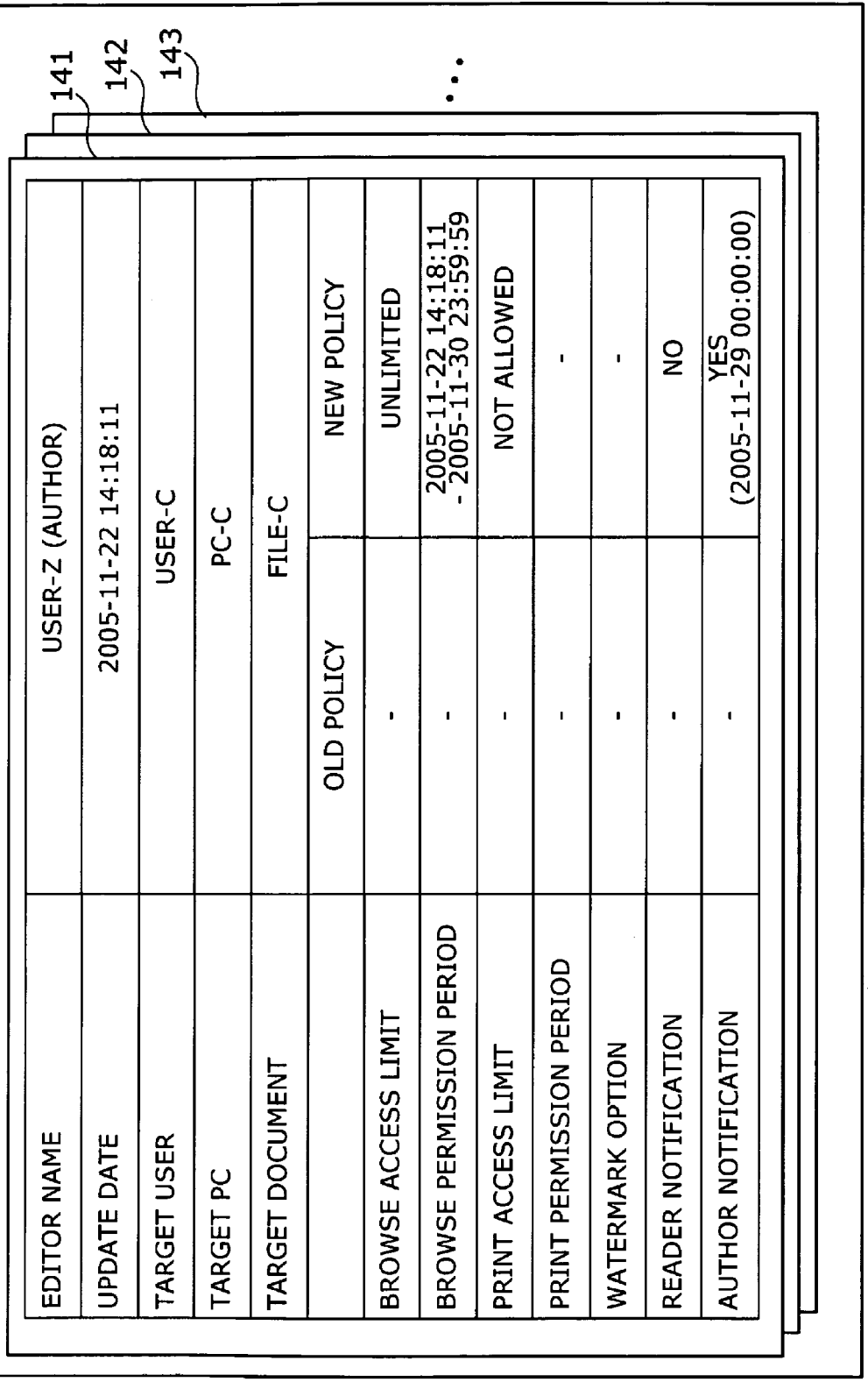
FIG. 10 shows an example data structure of a policy log database.

FIG. 10 shows an example data structure of the policy log database 140. The illustrated policy log database 140 contains a plurality of policy logs 141, 142, 143, and so on. Each policy log begins with the following data fields: "Editor Name," "Update Date," "Target User," "Target PC," and "Target Document." The editor name field shows who defined or updated the access policy. Specifically, an access policy can be edited by the author of the target document or the access policy manager 151. In the former case, the user name of the author is entered to the editor name field. In the latter case, the field is set to "AUTO" to indicate that the access policy manager 151 has changed the policy automatically because of improper access or the like. The update date field indicates when the access policy was changed. The target user field contains the name of a user to which the updated access policy is applied. The target PC field contains the name of a client to which the updated access policy is applied. The target document field contains the name of a document being managed.

The above data fields are followed by a set of access policy parameters, including: "Browse Access Limit," "Browse Permission Period," "Print Access Limit," "Print Permission Period," "Watermark Option," "Reader Invitation," and "Author Notification." Each policy log 141, 142, 143, and so on contains old values and new values of those parameters.

The policy log 141 of FIG. 10 represents the initial state of the access policy 111 shown in FIG. 7, and it thus contains nothing in its "Old Policy" fields. Both old and new policy fields will be filled in with specific values when an existing policy is updated in response to detection of an improper access, for example.

FIG. 11 shows an example of a policy log in the case where the access policy manager 151 has changed an access policy automatically. Specifically, the illustrated policy log 149 assumes that the access policy 111 of FIG. 7 has been modified to restrict the target user USER-C from making access to the managed document FILE-C, in response to detection of an improper access.

The changed policy log 149 now has a value of "AUTO (IMPROPER ACCESS DETECTED)" in its editor field. The browse access limit field is also changed from "UNLIMITED" to "NO BROWSING." Yet another change is removal of the browse permission period.

Access Policy Management

As can be seen from the preceding sections, the document access management server 100 is designed to collect both access logs and policy logs of a document. Policy log records show how the document's access policy is defined and modified. When an improper access is observed, the author of the document searches the access logs and policy logs to analyze the access policy at that time. The author can track down the exact reason why that access is determined to be improper. The following description will focus on each individual process performed within the system.

Figure 12:
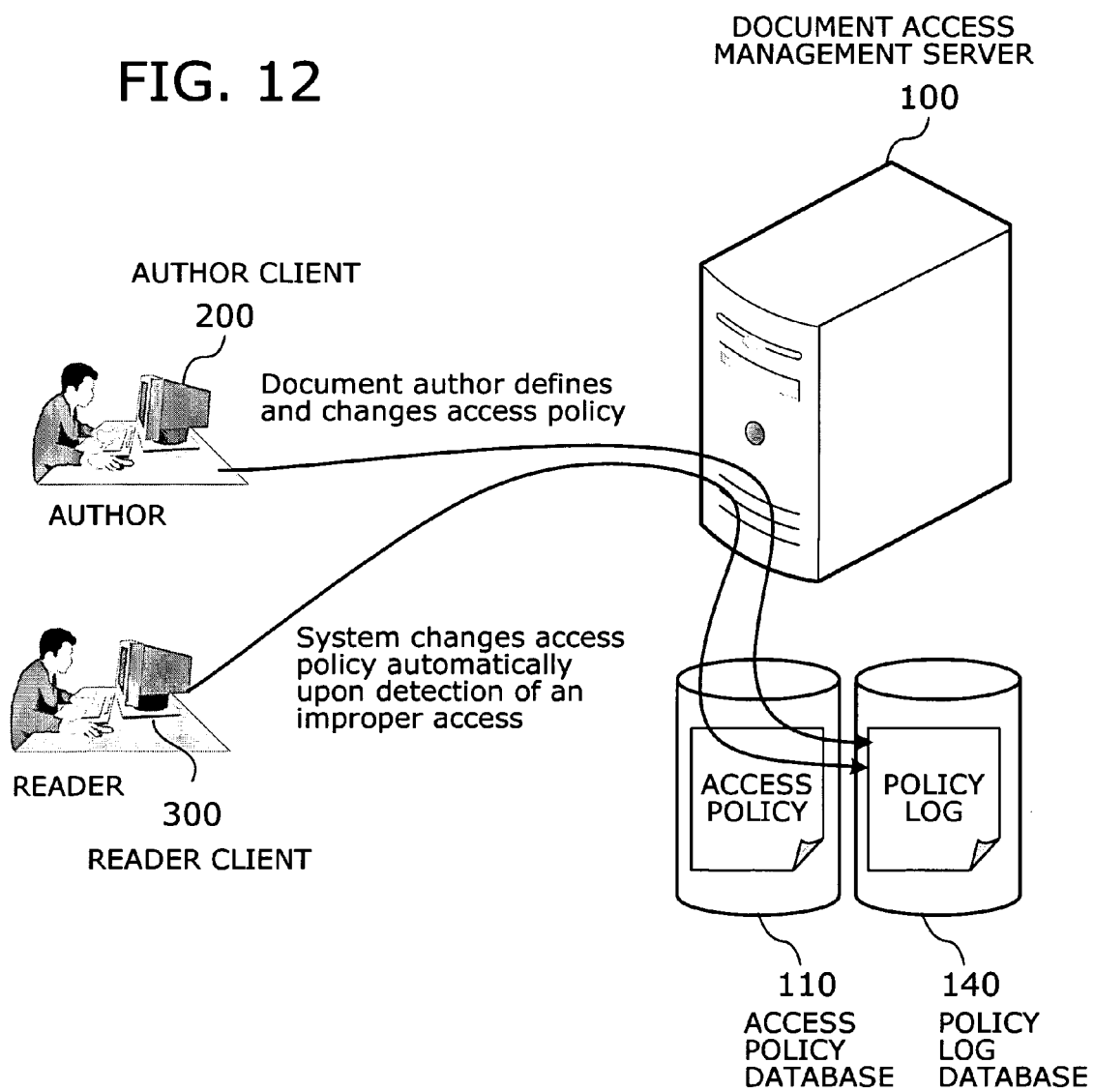
FIG. 12 is a conceptual view of policy log collection.

FIG. 12 is a conceptual view of a policy log collection process. The policy log collection is initiated when, for example, the author of a document creates a new access policy or changes an existing access policy by sending commands from his/her client 200 to the document access management server 100. Access policies may also be modified automatically upon detection of an improper access from a reader to a document. The document access management server 100 enforces such a policy modification on the basis of an access log 33 collected from the reader client 300. The document access management server 100 also records that modification in the form of a policy log.

Further, the document access management server 100 manages the browse permission period and print permission period of each document as part of its access policy management functions. Expiration of either period causes an update to a relevant policy log. More specifically, the access policy manager 151 periodically looks into access policies stored in the access policy database 110 so as to determine whether each specified browse permission period or print permission period has expired. Upon detection of an access policy with an expired browse permission period or print permission period, the access policy manager 151 changes that access policy to cancel the corresponding permission. This change in the access policy triggers the policy log collector 152 to create a policy log record for storage in the policy log database 140.

Figure 13:
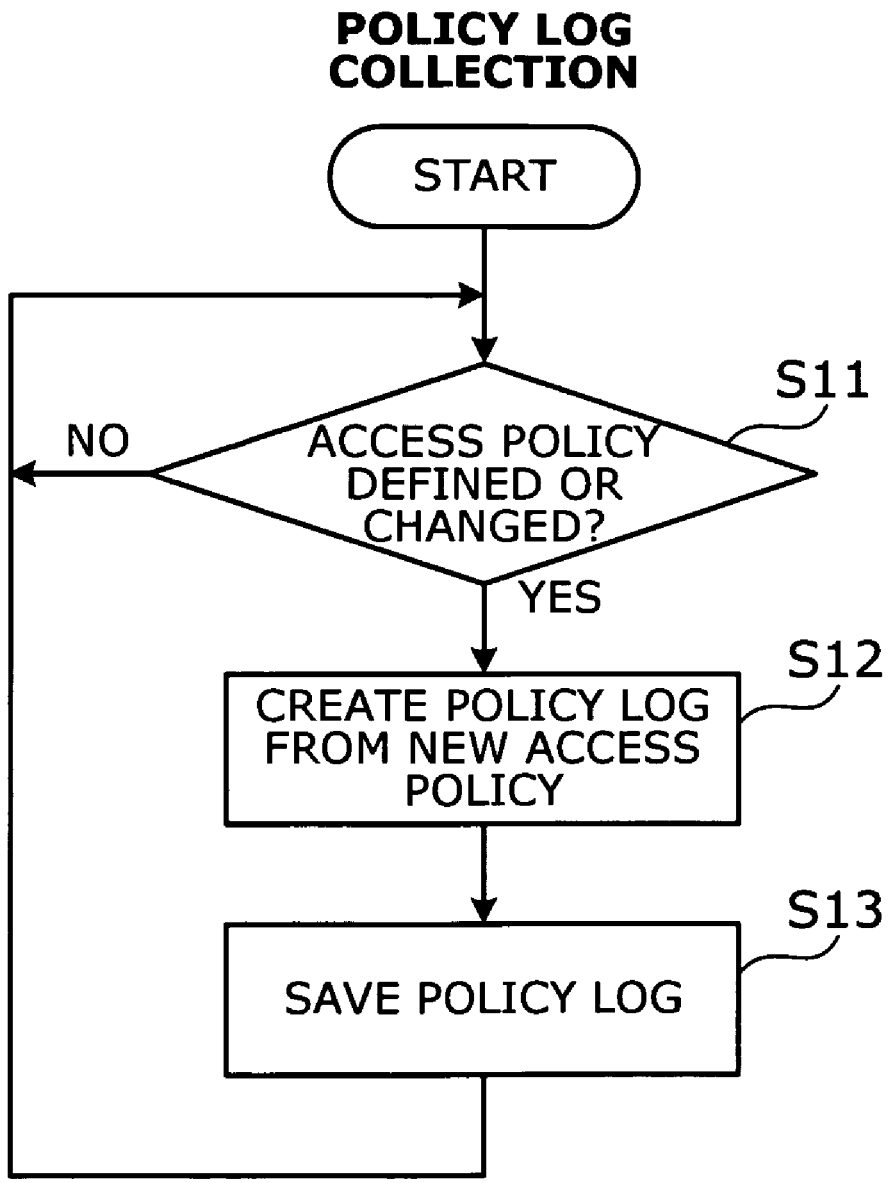
FIG. 13 is a flowchart of a policy log collection process.

FIG. 13 is a flowchart of a policy log collection process. This process includes the following steps:

(Step S11) The policy log collector 152 determines whether the access policy manager 151 has changed an entry of the access policy database 110 (including creation of a new access policy entry). If any change is found, the process advances to step S12. If not, the policy log collector 152 repeats this step S11.

(Step S12) The policy log collector 152 produces a policy log record from the old and new values of access policy parameters or from newly defined access policy parameters. More specifically, in the case of a new access policy, the policy log collector 152 produces a policy log containing the parameters specified in that new policy. In the case of a change to an existing access policy, the policy log collector 152 produces a policy log containing both old values and new values of the changed parameters.

(Step S13) The policy log collector 152 saves the produced policy log record in the policy log database 140.

Through the above steps, the policy log collector 152 creates and accumulates policy logs each time a new access policy is defined or an existing access policy is modified. When the document 31 is accessed by a client 300, the document access management server 100 then collects an access log 33 from that client 300.

Figure 14:
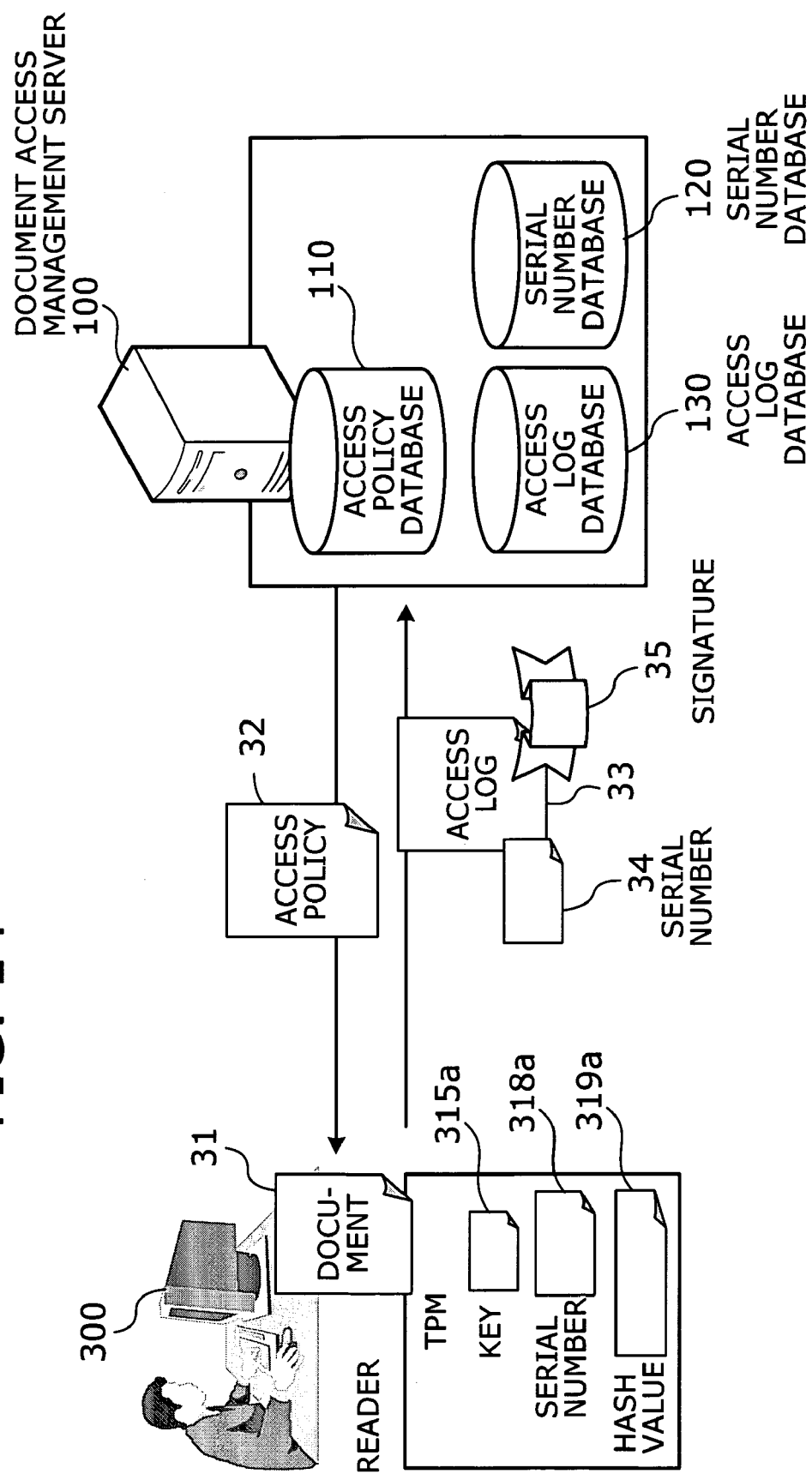
FIG. 14 givens an overview of access log collection.

FIG. 14 gives an overview of an access log collection process. Suppose that the reader sitting at the client 300 attempts to read the document 31 by entering a command to the client 300. This user command first causes the document access management server 100 to send an access policy to the reader client 300. More specifically, the reader client 300 issues an access policy request to the document access management server 100, which contains the user name of the requesting reader, client name of the requesting client 300, and file name of the requested document 31. In response to this request, the document access management server 100 searches the access policy database 110 to find an access policy whose target user, target PC, and target document fields match respectively with the user name, client name, and file name specified in the access policy request. The document access management server 100 sends the found access policy 32 back to the reader client 300.

Based on the received access policy 32, the reader client 300 determines whether the access is permitted or denied. If the access is permitted, the reader client 300 extracts a key 315a from the TPM for use in decrypting the document 31, thus allowing the user to browse the decrypted document 31 on a monitor screen of the reader client 300.

The above read access to the document 31 causes the reader client 300 to produce an access log 33. If the reader client 300 can communicate with the document access management server 100 at that moment, the reader client 300 calculates a hash 319a from the access log 33 and a serial number 318a stored in the TPM and saves the resulting hash 319a in the TPM. The reader client 300 also generates a signature 35 by encrypting the hash 319a with a private key in the TPM.

The reader client 300 sends the access log 33 to the document access management server 100, together with the serial number 34 and signature 35. The document access management server 100 then authenticate the signature 35 using a serial number that is stored in the serial number database 120 in association with the reader client 300. If the signature 35 is validated, the document access management server 100 adds the received access log 33 to the access log database 130.

Figure 15:
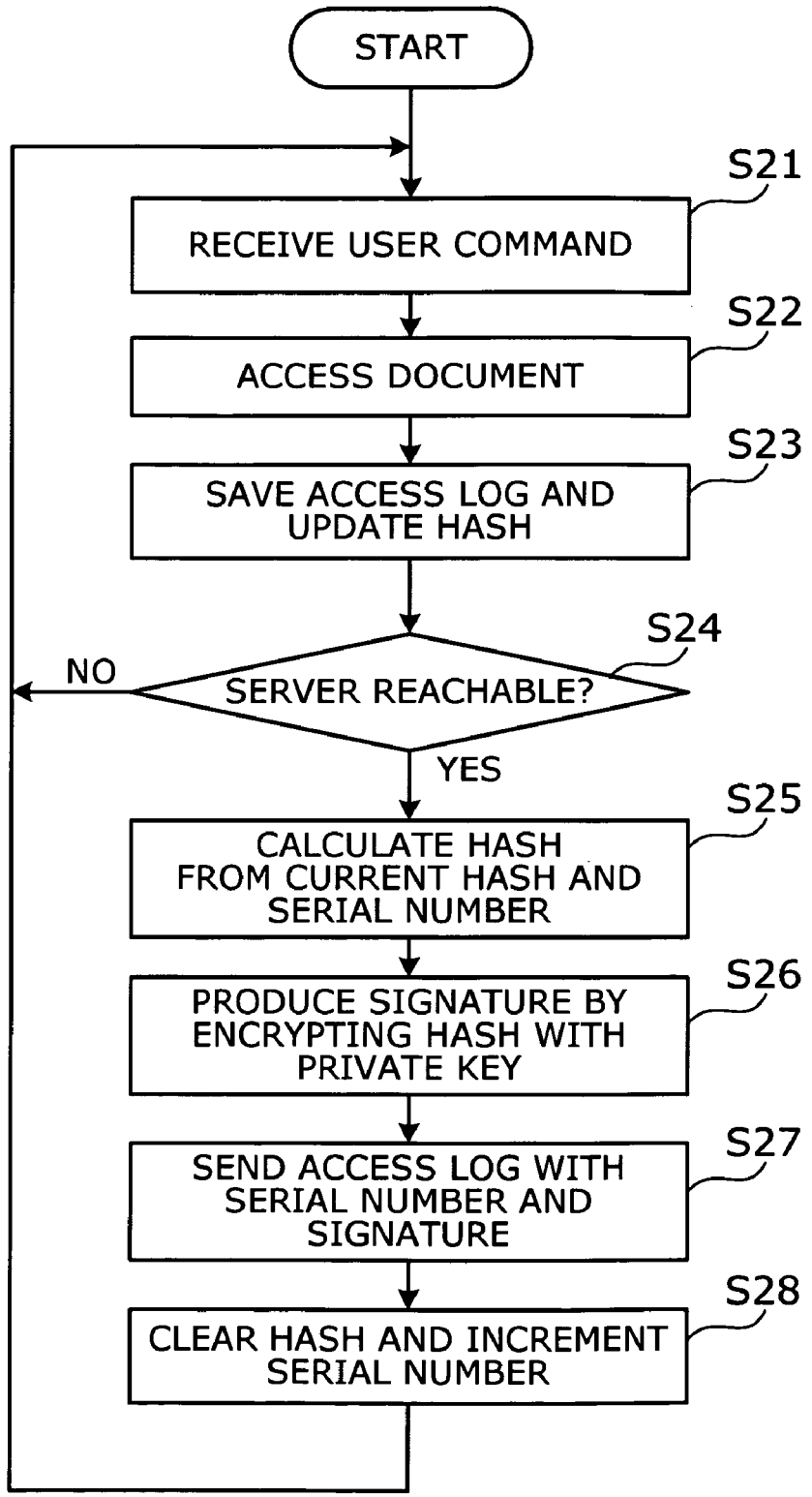
FIG. 15 shows how a reader client uploads its access log to the document access management server.

FIG. 15 shows how the reader client 300 uploads its access log to the document access management server 100. This process includes the following steps:

(Step S21) The document browser 313 receives a user command that requests browsing of a document 31.

(Step S22) The document browser 313 makes access to the document 31. More specifically, the document browser 313 first asks the access permission handler 314 to determine whether to accept or deny the access request. Then the access permission handler 314 requests the document access management server 100 to provide an access policy 32 relevant to the document 31. The access permission handler 314 determines whether the provided access policy 32 gives permission to the requesting user for access to the document 31. If the user has no permission, the access permission handler 314 notifies the document browser 313 of denial of the access request for the document 31. The document browser 313 thus terminates the requested access with an error code. If, on the other hand, the access policy 32 permits the user to make access to the document 31, the access permission handler 314 notifies the document decryptor 315 of approval. The document decryptor 315 then decrypts the document 31 and sends it to the document browser 313, and the document browser 313 displays the decrypted document 31 on a monitor screen.

(Step S23) Upon access to the document 31, the access log generator 316 produces an access log 33 and adds it to the access log database 317. The signature generator 320 calculates a hash of access logs stored in the access log database 317. More specifically, the signature generator 320 calculates a hash from the newly created access log 33 alone in the case where no hash is present in the hash memory 319. In the case where the hash memory 319 contains a hash, the signature generator 320 calculates a new hash from that existing hash and the newly created access log 33. Lastly the signature generator 320 updates the hash memory 319 with the new hash.

(Step S24) The signature generator 320 determines whether the document access management server 100 can be reached. This test is accomplished by, for example, issuing a ping or other command to the document access management server 100 to verify the connectivity. If the document access management server 100 is reachable, the process advances to step S25. If not, the process returns to step S21.

(Step S25) The signature generator 320 calculates a hash from the present hash stored in the hash memory 319 and serial number.

(Step S26) The signature generator 320 produces a signature 35 by encrypting the hash stored in the hash memory 319 with a private key in the TPM.

(Step S27) The access log uploader 321 transfers the access log 33 from the access log database 317 to the document access management server 100, together with the serial number 34 and signature 35 affixed to it. Upon seeing that the access log 33 is successfully uploaded to the document access management server 100, the signature generator 320 removes the access log 33 from the access log database 317.

(Step S28) The signature generator 320 clears the current hash in the hash memory 319 and increments the serial number in the serial number memory 318 by one. The process then returns to step S21 to repeat the above processing.

Figure 16:
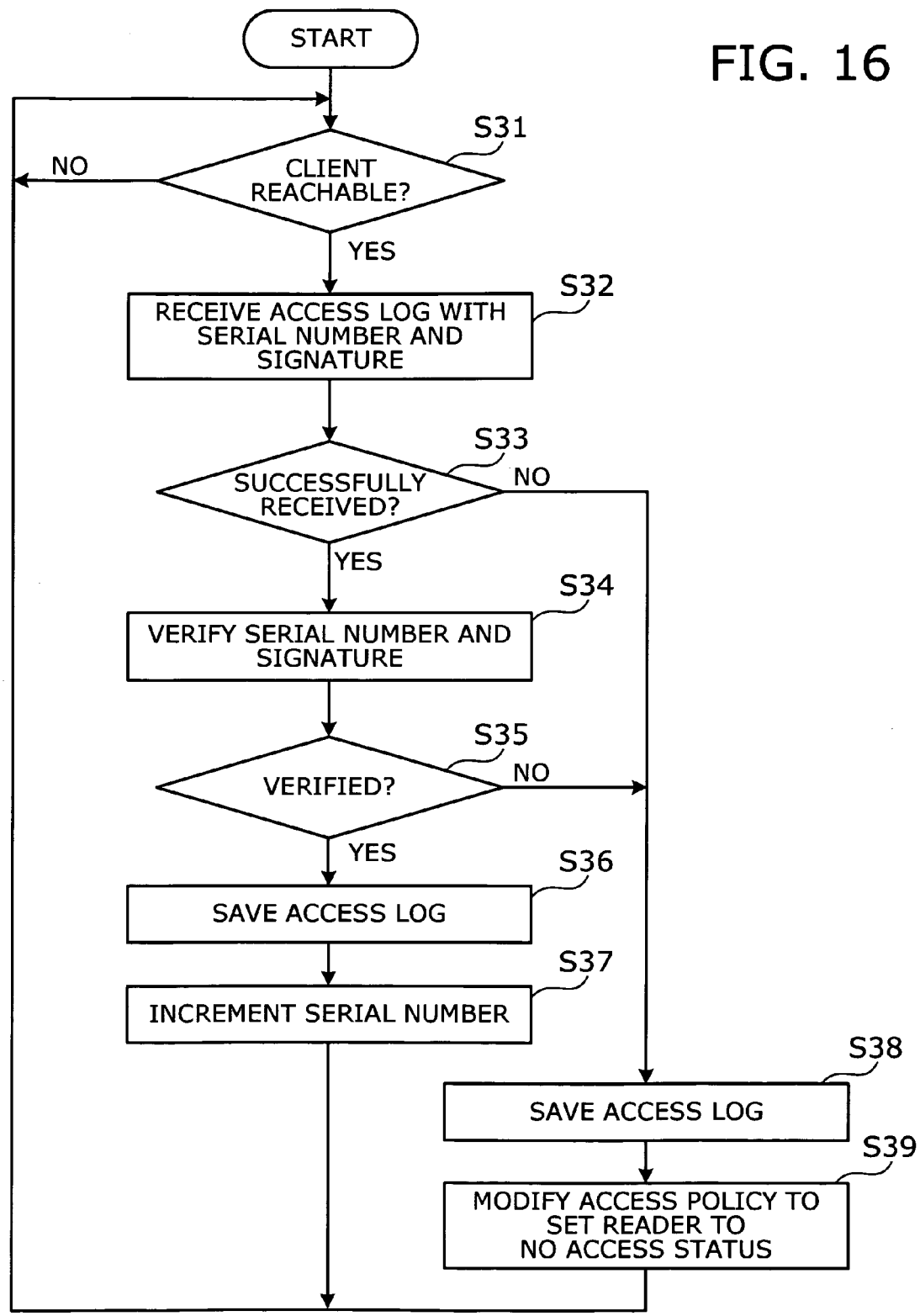
FIG. 16 is a flowchart showing how the document access management server collects access logs.

FIG. 16 is a flowchart showing how the document access management server 100 collects an access log. This process includes the following steps:

(Step S31) The access log collector 154 determines whether the reader client 300 is reachable. If so, the process advances to step S32. If not, the access log collector 154 repeats this step S31 until the reader client 300 becomes reachable.

(Step S32) The access log collector 154 collects an access log 33 from the reader client 300, along with a serial number 34 and a signature 35 affixed to the access log 33.

(Step S33) The access log collector 154 determines whether the access log 33 has been received correctly from the reader client 300, including its serial number 34 and signature 35. If so, the process advances to step S34. If not, the process branches to step S38.

(Step S34) The access log collector 154 verifies the serial number 34 and signature 35 of the received access log 33. More specifically, the access log collector 154 compares the serial number 34 of the access log 33 with the one stored in the serial number database 120, the latter being stored in association with the reader client 300. If the two serial numbers coincide with each other, it means that the received serial number 34 is consistent with preceding numbers or, in other words, the continuity of serial numbers is verified. The access log collector 154 further decrypts the received signature 35 with a previously defined decryption key, thus obtaining a hash corresponding to the serial number.

Then the access log collector 154 produces a hash from the serial number in the serial number database 120 and the access log 33. The reader client 300, however, may have sent a plurality of access logs 33 with a single serial number 34. If this is the case, the access log collector 154 selects those access logs sequentially in the chronological order, with reference their respective time stamps. The access log collector 154 calculates a hash from the first access log and adds this first selected hash to the second access log for subsequent calculation of another hash. Hash calculation is repeated in this way. When a hash for the last (latest) access log is produced, the access log collector 154 uses this hash, together with the serial number stored in the serial number database 120, to calculate a final hash.

The access log collector 154 then compares the hash produced in the way described above with the one decoded from the signature 35. If they coincide with each other, the access log collector 154 determines that the signature 35 is valid.

(Step S35) If the serial number 34 is consistent and if the signature 35 is found valid, the access log collector 154 determines that the verification of the received access log 33 is successful and thus advances the processing to step S36. If the serial number 34 is inconsistent, or if the signature 35 is found invalid, the verification fails. In that case, the access log collector 154 moves to step S38.

(Step S36) The access log collector 154 adds the received access log 33 to the access log database 130.

(Step S37) The access log collector 154 increments the serial number in the serial number database 120 by one and proceeds to step S31.

(Step S38) The access log collector 154 adds the received access log 33 to the access log database 130, with a code indicating the occurrence of an improper access.

(Step S39) The access policy manager 151 retrieves an access policy whose target client field matches with the client name stored in the source client field of the received access log 33 and modifies that access policy so as to remove the browse permission. Specifically, it sets a field value of "NOT ALLOWED" to the browse access limit field. Optionally, the access policy manager 151 may strip the browse permission from the reader, i.e., the user who has committed an improper access, by modifying all access policies containing his/her user name in their target user field. The process then goes back to step S31 to repeat the above steps.

As can be seen from the above, the document access management server 100 interprets unsuccessful reception of an access log from a client as the possibility of an improper access by the user of that client. For this reason, the access policy is automatically modified to inhibit the user from browsing the document.

The access log database 130 stores not only the latest access log, but also past access logs. In the case where such past access logs are accumulated, the document access management server 100 uses an existing hash in the hash memory 319 to produce a hash of a newly given access log. This configuration prevents access logs from being tampered with, even if the access log database 130 is placed in a non-TPM storage space. More specifically, according to the present embodiment, the hash memory 319 is located in a TPM, meaning that the hash is protected by the TPM mechanism. Tampering of an access log would render the access log inconsistent with the hash stored in the hash memory 319. The document access management server 100 can therefore detect bad behavior of the reader client 300.

Figure 17:
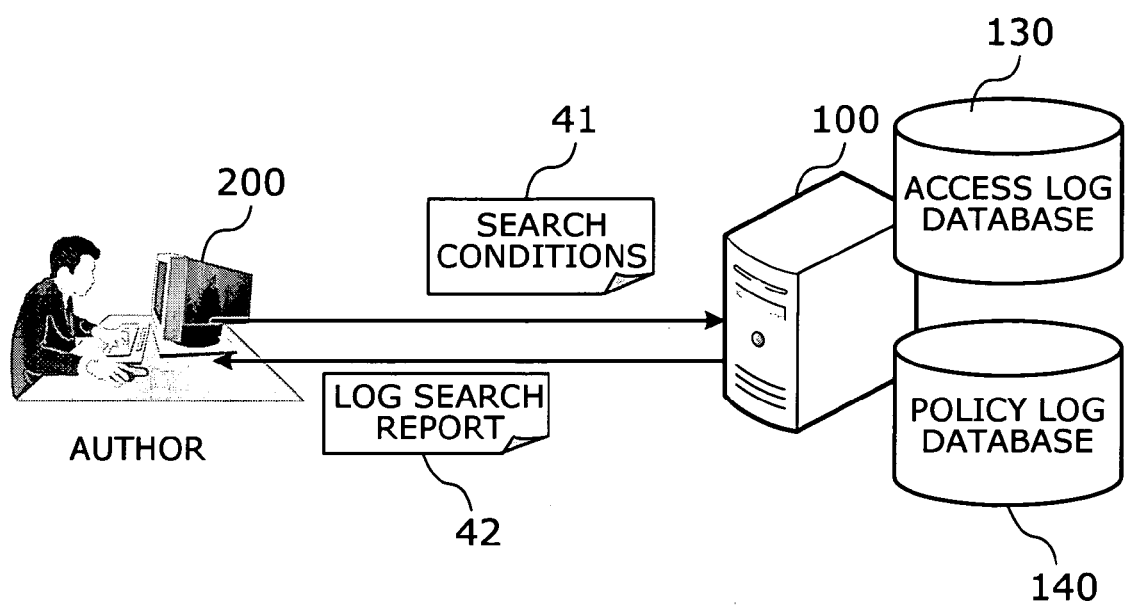
FIG. 17 gives an overview of a log search operation.

The access logs and policy logs stored in the document access management server 100 are made searchable by the author of a document 31. FIG. 17 gives an overview of such a log search operation. The author of a document 31 is allowed to search the logs by entering a search command to his/her client 200. This command causes search conditions 41 to be transmitted from the author client 300 to the document access management server 100. Upon receipt of those search conditions 41, the document access management server 100 searches the access log database 130 and policy log database 140 and compiles a log search report 42 from the search results for delivery to the author client 300.

Figure 18:
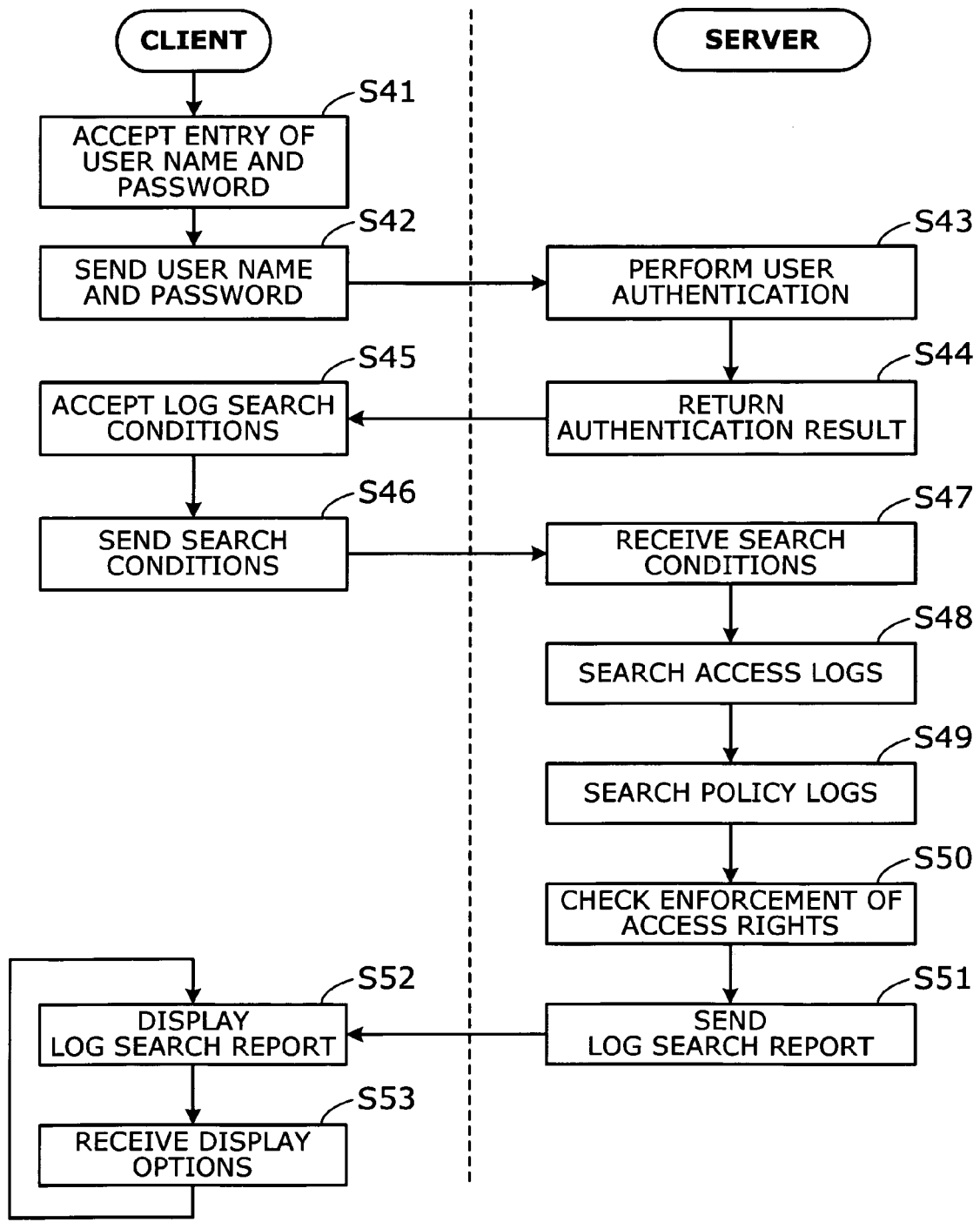
FIG. 18 is a sequence diagram of a log search operation.

FIG. 18 is a sequence diagram of a log search operation. The sequence of FIG. 18 includes the following steps:

(Step S41) The access log browser 250 in the author client 300 receives a user name and password from the document author.

(Step S42) The access log browser 250 forwards the received user name and password to the document access management server 100.

(Step S43) In the document access management server 100, the log searcher 155 initiates a user authentication process with the user name and password received from the author client 300.

(Step S44) The log searcher 155 returns the result of user authentication to the author client 300. It is assumed in this description that the user is successfully authenticated.

(Step S45) Upon receipt of the authentication result, the access log browser 250 in the author client 300 prompts the author to specify a search condition, which may include, for example, target user, target client, document file name, action (e.g., browse, print), and time period.

(Step S46) The access log browser 250 transmits the specified search condition to the document access management server 100.

(Step S47) The log searcher 155 in the document access management server 100 receives the search condition from the author client 300.

(Step S48) The log searcher 155 searches the access log database 130 to find access log records that match with the specified search condition.

(Step S49) The log searcher 155 searches the policy log database 140 to find policy log records that match with the specified search condition.

(Step S50) Based on the found log records, the log searcher 155 determines whether the users have enforced their access rights. More specifically, some users are eligible for browsing document or printing documents or both. In other words, they have the browse right or print right or both. The log searcher 155 determines whether those users have actually browsed documents or printed documents.

(Step S51) The log searcher 155 sends a log search report to the author client 200, together with the information about enforcement of access rights.

(Step S52) In the author client 300, the access log browser 250 displays the received log search report on a monitor screen.

(Step S53) The access log browser 250 permits the document author to specify display options for selectively displaying some specific part of the log information. The display options include, for example, a condition for sorting data with time stamps. When such options are specified, the access log browser 250 refreshes the display by applying new display options and returns to step S52.

Example Screenshots

Referring now to FIGS. 19 to 27, this section gives various example screenshots of search result.

FIG. 19 shows a search result for FILE-A. This screenshot represents what appears on a monitor screen when a search is performed with "FILE-A" specified as a search condition. Specifically, the example screenshot contains access log records of document browsing by two users, USER-A and USER-B. It also contains policy log records, representing some changes made to relevant access policies, including assignment of access rights and cancellation of access permission. The search result of FIG. 19 indicates that the document FILE-A is read by two users, USER-A and USER-B, out of three eligible users. It also shows that only USER-B has not read FILE-A.

FIG. 20 shows a search result for FILE-B. This screenshot represents what appears on a monitor screen when a search is performed with "FILE-B" specified as a search condition. Specifically, the example screenshot of FIG. 20 contains access log records showing that the document FILE-B has been read by USER-A and USER-B. It also indicates an invalid browsing attempt by USER-B. The search result also contains policy log records that represent initial assignment of access rights and expiration of the browse permission period of USER-B. The search result of FIG. 20 as a whole indicates the fact that USER-B attempted to browse FILE-B after his/her permission period had expired.

FIG. 21 shows a search result for FILE-C. This screenshot represents what appears on a monitor screen when a search is performed with "FILE-C" specified as a search condition. Specifically, the example screenshot of FIG. 21 contains access log records showing that the document FILE-C has been read by USER-B. It also indicates an invalid browsing attempt by USER-C. The screenshot further contains a policy log record indicating the fact that PC-C of USER-C was set to "no access" status before USER-C made read access.

FIG. 22 shows a search result for USER-A. This screenshot represents what appears on a monitor screen when "USER-A" is specified as a search condition. As can be seen from the example of FIG. 22, USER-A is allowed to browse FILE-A and FILE-B, and he/she has actually browsed both of them. Note that the search result of FIG. 22 contains a policy log record indicating that PC-C was set to no-access status, while the record gives no information about the corresponding user. That is, the system is designed to search policy logs including those containing no user information when a user name is specified as a search condition. For this reason, the search result includes a policy log record about a client that could have been used by USER-A.

FIG. 23 shows a search result for USER-B. This screenshot represents what appears on a monitor screen when "USER-B" is specified as a search condition. As can be seen from the example of FIG. 23, USER-B is allowed to browse FILE-A, FILE-B, and FILE-C, and he/she has already browsed FILE-B and FILE-C. FILE-A alone remains unread. Also, the search result shows the fact that USER-B attempted to browse FILE-B after the browse deadline had expired.

FIG. 24 shows a search result for USER-C. This screenshot represents what appears on a monitor screen when "USER-C" is specified as a search condition. As can be seen from the example of FIG. 24, USER-C is allowed to browse FILE-A and FILE-C, and he/she has already browsed FILE-A while FILE-C remains unread. The search result also shows that USER-C attempted to browse FILE-C without success because he/she used a non-eligible client, PC-C, in making that attempt.

FIG. 25 shows a search result for PC-A. This screenshot represents what appears on a monitor screen when "PC-A" is specified as a search condition. As can be seen from the example of FIG. 25, PC-A is eligible for use in browsing FILE-A and FILE-B, and USER-A has actually used PC-A to browse those files.

FIG. 26 shows a search result for PC-B. This screenshot represents what appears on a monitor screen when "PC-B" is specified as a search condition. As can be seen from the example of FIG. 26, PC-B is eligible for use in browsing FILE-A, FILE-B, and FILE-C, but the browse permission of FILE-B has already expired. The search result also shows that USER-B attempted to browse FILE-B using PC-B after the deadline of FILE-B.

FIG. 27 shows a search result for PC-C. This screenshot represents what appears on a monitor screen when "PC-C" is specified as a search condition. The example search result of FIG. 27 shows that PC-C was initially eligible for use in browsing FILE-A and FILE-C, but the permission was cancelled afterwards. The search result also shows the fact that USER-C attempted to browse FILE-C with PC-C after the permission of PC-C was cancelled.

As can be seen from the above example screenshots, the present embodiment offers a conditional search result of access logs and policy logs, which gives information about users who are eligible for browsing a specific document but have not yet enforced their access rights. The document access management server 100 may optionally send a message to invite such users to read the delivered document, as will be described in the next section.

User Invitation

Figure 28:
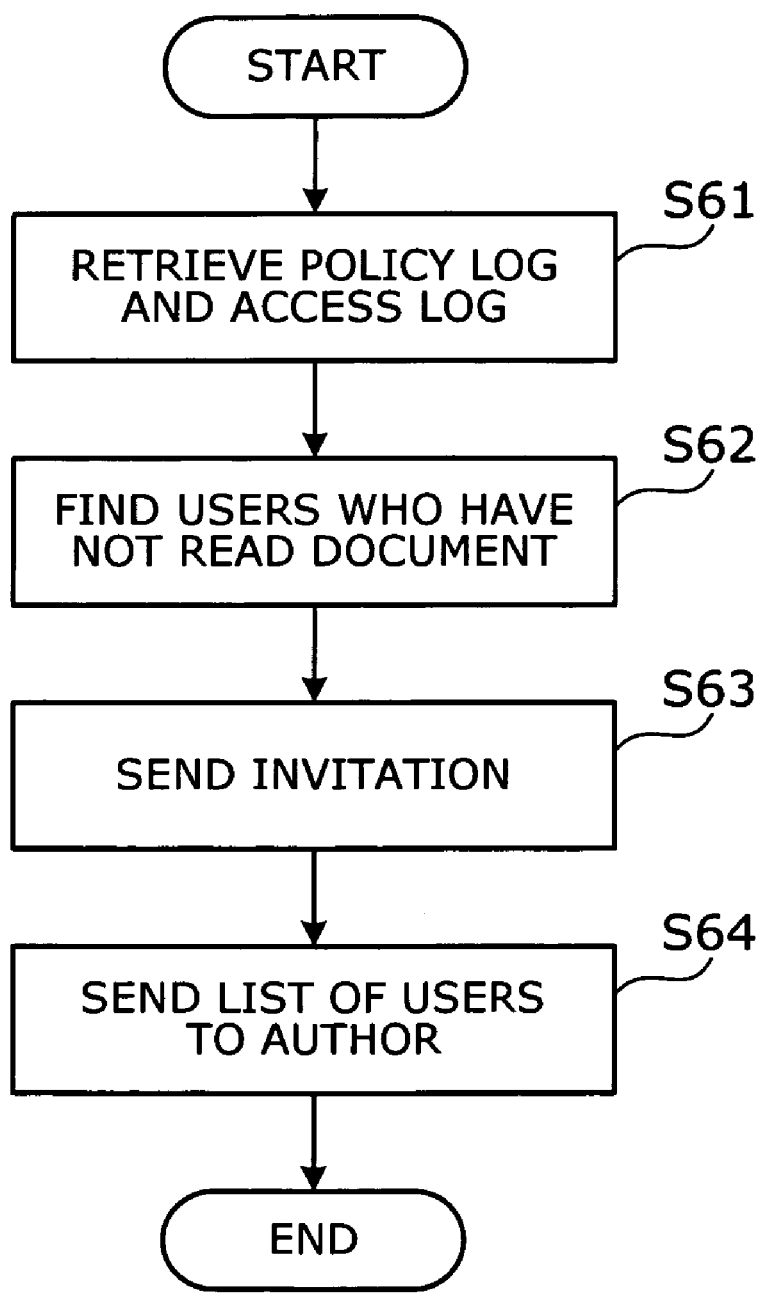
FIG. 28 is a flowchart showing a process of inviting a user to browse a document.

FIG. 28 is a flowchart showing a process of inviting a user to browse a document. This process includes the following steps:

(Step S61) The invitation message sender 156 interacts with the log searcher 155 at a predetermined time (e.g., at a particular time of day) to request a search for the users who have not read a specific document. Upon receipt of this request, the log searcher 155 searches the access log database 130 and policy log database 140 using the name of the specified document as a search keyword, thereby retrieving access log records and policy log records relevant to the specified document.

(Step S62) The log searcher 155 checks each eligible user who has not read the document. More specifically, the log searcher 155 consults collected policy logs to determine who are eligible for browsing the specified document. The log searcher 155 then consults collected access logs to identify the eligible users who have not read the document and notifies the invitation message sender 156 of the names of those users.

(Step S63) The invitation message sender 156 sends an invitation message to the users who have not read the document.

(Step S64) The invitation message sender 156 provides the document author with a list of users who have not read the document.

Through the above processing steps, an invitation message is automatically sent to the users who have not read a specific document, so as to prompt them to browse the document.

Second Embodiment

According to a second embodiment of the invention, the continuity of access logs is ensured by using previous hashes, unlike the first embodiment which uses serial numbers for the same purpose. That is, the first embodiment is designed to verify the continuity of serial numbers to ensure that there are neither missing access logs nor duplicated access logs. According to the second embodiment, each client memorizes a previously sent hash for use in calculating a new hash for the next access log. Since one hash is linked to another in this way, the document access management server can detect any missing access logs in those received from a client as an inconsistent sequence of hashes. That is, the linked hashes can be used to ensure the continuity of access logs.

Figure 29:
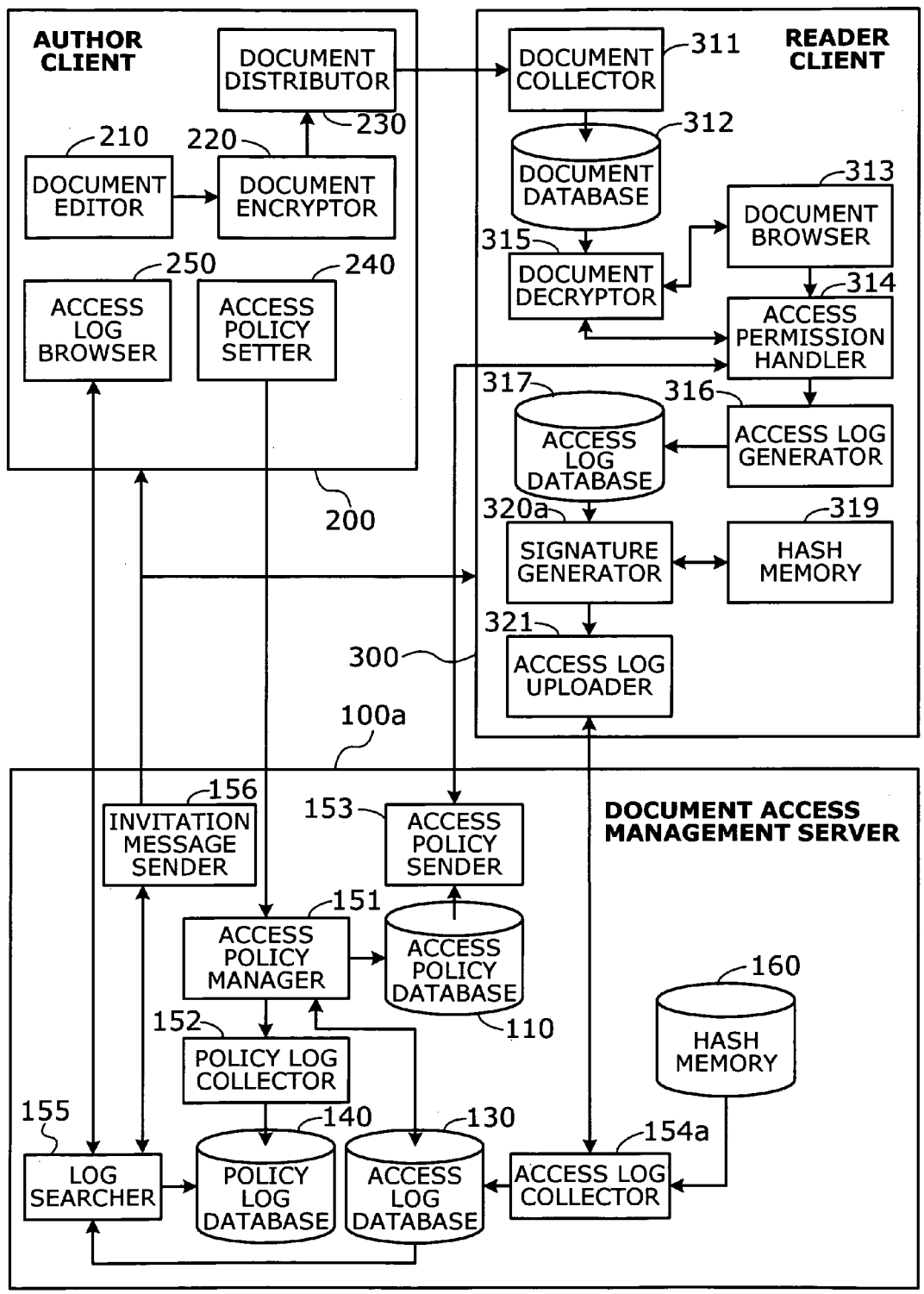
FIG. 29 is a functional block diagram of a second embodiment of the present invention.

FIG. 29 is a functional block diagram of the second embodiment of the invention. Since most functions shown in FIG. 29 are similar to those of the first embodiment discussed in FIG. 6, the following explanation of FIG. 29 will focus on the distinct features of the second embodiment while affixing like reference numerals to like elements.

As can be seen from FIG. 29, the second embodiment differs from the first embodiment in its client 300a and document access management server 100a. More specifically, the reader client 300a is different from its counterpart in the first embodiment in that the signature generator 320a offers some distinct processing functions, as well as in that it eliminates the serial number memory 318 of the first embodiment. The signature generator 320a of the second embodiment calculates a hash at the time of uploading an access log and saves it in a hash memory 319. The stored hash is used together with a newly created access log to produce a new hash for that access log.

The document access management server 100a is different from its counterpart in the first embodiment in that the access log collector 154a offers some distinct processing functions, as well as in that the serial number database 120 is replaced with a hash memory 160. The hash memory 160 is a storage space for hashes that are calculated each time the access log collector 154a collects an access log or access logs. For example, a part of the HDD 103 is allocated to this hash memory 160. The access log collector 154a calculates a hash corresponding to a received access log, using the previous hash stored in the hash memory 160.

Figure 30:
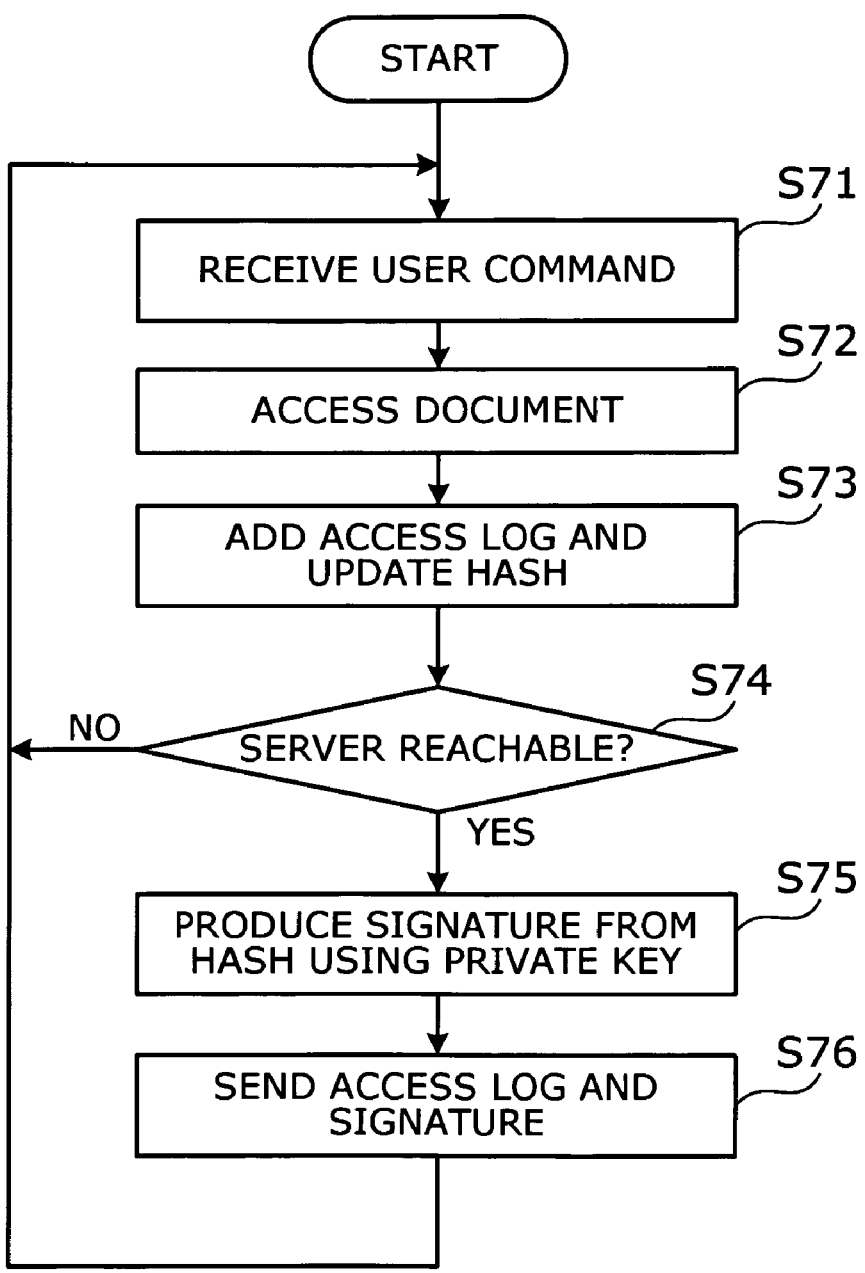
FIG. 30 is a flowchart showing how a reader client uploads an access log in the second embodiment.
Figure 31:
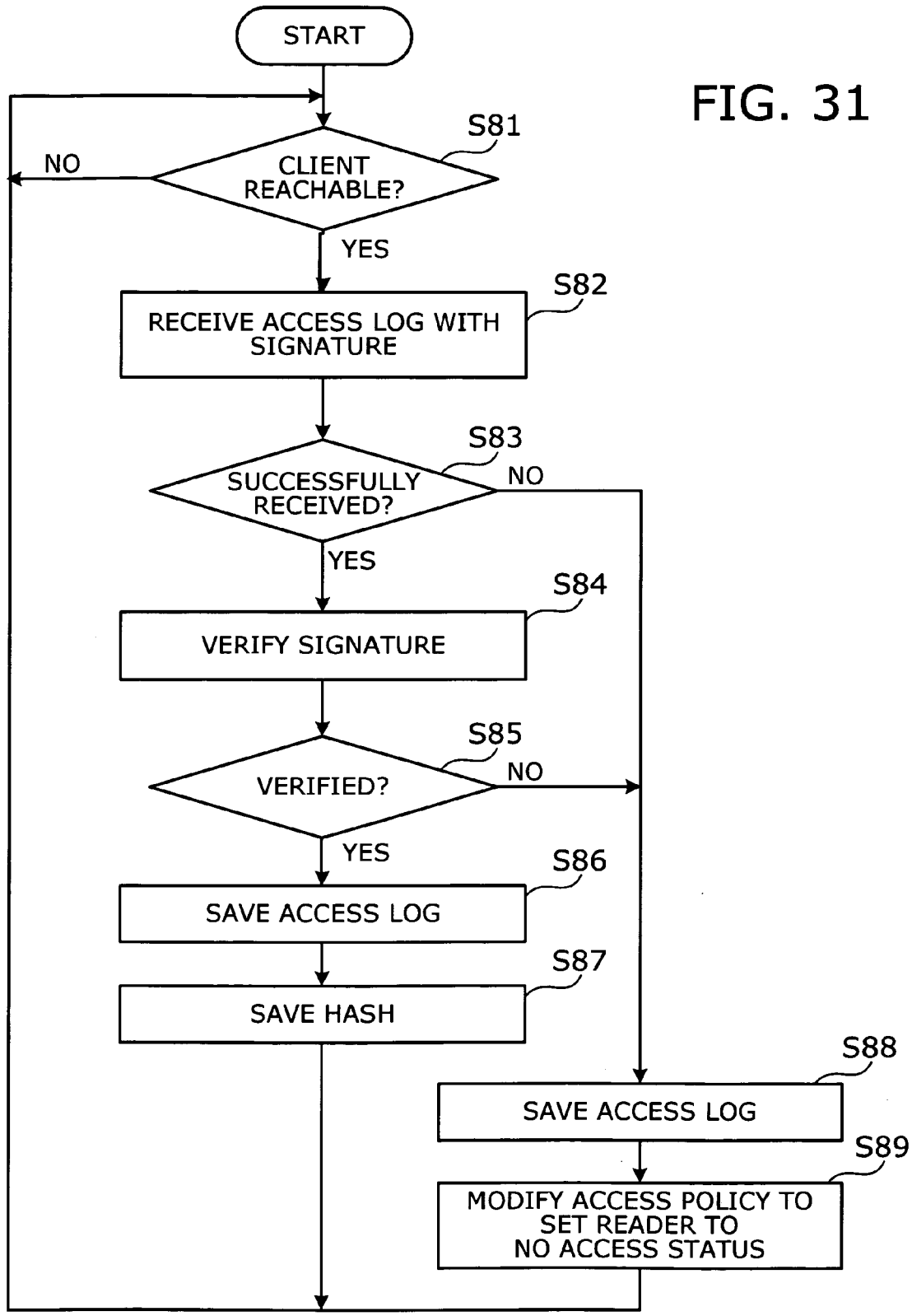
FIG. 31 is a flowchart showing how the document access management server ensures the continuity of access logs using a previous hash.
Figure 32:
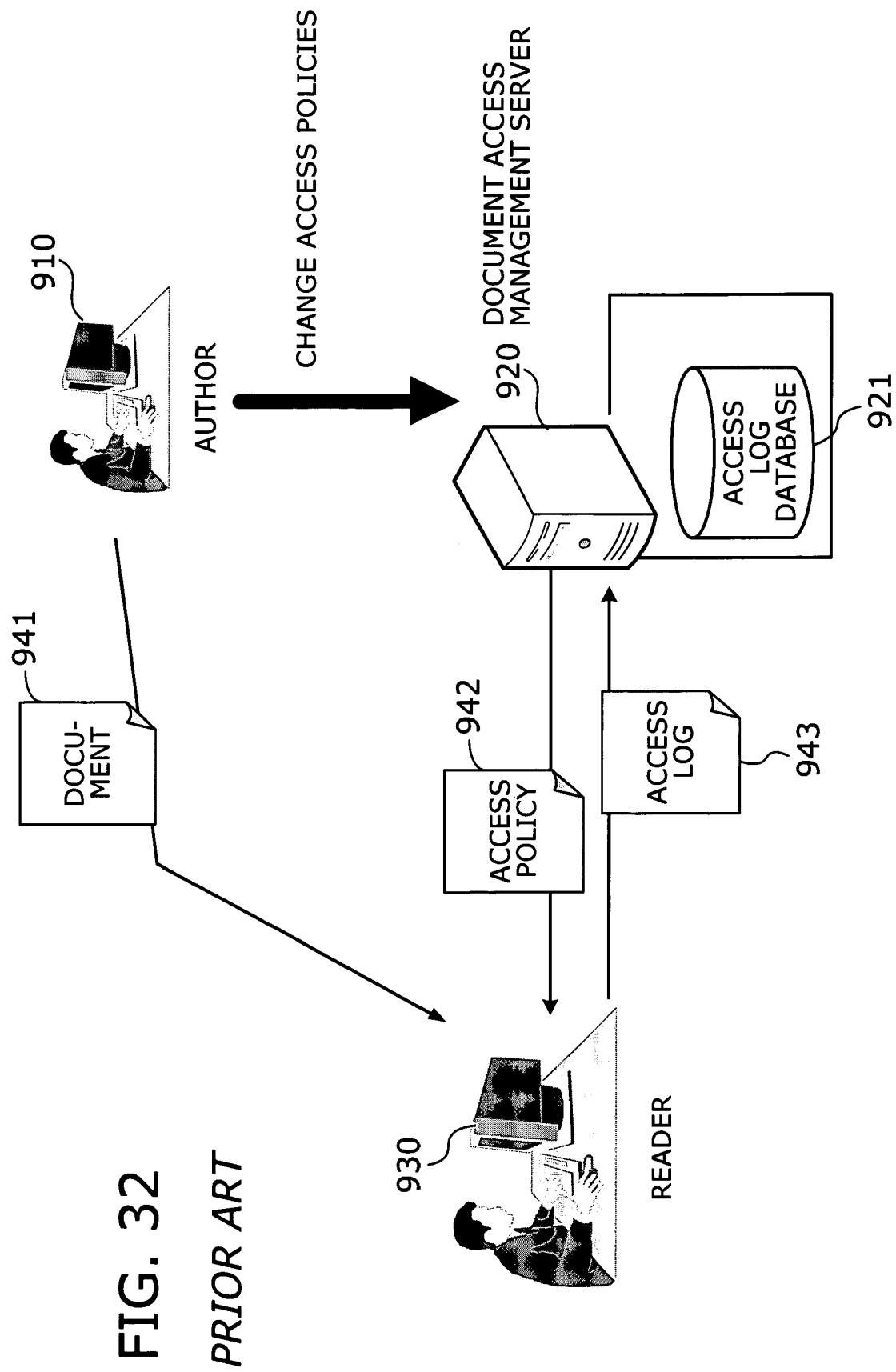
FIG. 32 shows an example of a conventional file management system.

Referring now to flowcharts of FIGS. 30 and 31, the following will describe in detail how the document access management server 100a ensures the continuity of access logs when they are received from the reader client 300a. FIG. 30 is a flowchart showing how the reader client 300a uploads an access log. This process includes the following steps:

(Step S71) The document browser 313 receives a user command that requests browsing of a document 31.

(Step S72) The document browser 313 makes access to the document 31. For details of this step S72, see the earlier description of step S22 of FIG. 15.

(Step S73) Upon access to the document 31, the access log generator 316 produces an access log 33 and adds it to the access log database 317. This triggers the signature generator 320a to calculate a hash of access logs stored in the access log database 317. If there is an existing hash in the hash memory 319, that hash will be added to the stored access logs for use as source data of a new hash. The signature generator 320a then updates the hash memory 319 with the resulting new hash.

(Step S74) The signature generator 320a determines whether the document access management server 100a can be reached. If the document access management server 100a is reachable, the process advances to step S75. If not, the process returns to step S71.

(Step S75) The signature generator 320a produces a signature 35 by encrypting the hash stored in the hash memory 319 with a private key in the TPM.

(Step S76) The access log uploader 321 transfers the access log 33 from the access log database 317 to the document access management server 100a, together with the signature 35 affixed to it. Upon seeing that the access log 33 is successfully uploaded to the document access management server 100a, the signature generator 320a removes the access log 33 from the access log database 317. The hash in the hash memory 319 is maintained as is. The process then goes back to step S71 to repeat the above steps.

FIG. 31 is a flowchart showing how the document access management server 100a ensures the continuity of access logs by using a previous hash. This process includes the following steps:

(Step S81) The access log collector 154a determines whether the reader client 300a can be reached. If the reader client 300a is reachable, the process advances to step S82. If not, the access log collector 154a repeats this step S81 until the reader client 300a becomes reachable.

(Step S82) The access log collector 154a receives an access log 33 with a signature 35 from the reader client 300a.

(Step S83) The access log collector 154a determines whether the access log 33 has been received correctly from the reader client 300a, including its serial number 34 and signature 35. If so, the process advances to step S84. If not, the process branches to step S88.

(Step S84) The access log collector 154a verifies the signature 35 of the received access log 33. Specifically, the access log collector 154a decrypts the received signature 35 with a previously given decryption key, thus obtaining a hash.

The access log collector 154a then produces a new hash from the hash in the hash memory 160 and the received access log 33. The reader client 300a, however, may have sent two or more access logs 33. If this is the case, the access log collector 154a selects those access logs sequentially in the chronological order, with reference to their respective time stamps. Specifically, the access log collector 154a calculates a hash from the first access log and the hash stored in the hash memory 160. Then the access log collector 154a uses this hash together with the next access log to calculate another hash. Hash calculation is repeated in this way. When a hash for the last (latest) access log is produced, the access log collector 154a compares this last hash with the hash decoded from the received signature 35. If the two hashes coincide with each other, the access log collector 154a concludes that the signature 35 is valid.

(Step S85) If the signature 35 is found valid, the access log collector 154a determines that the verification of the received access log 33 is successful and thus advances the processing to step S86. If the signature 35 is found invalid, the verification fails. In that case, the access log collector 154a moves to step S88.

(Step S86) The access log collector 154a adds the received access log 33 to the access log database 130.

(Step S87) The access log collector 154a stores the final hash of step S84 in the hash memory 160 and returns to step S81.

(Step S88) The access log collector 154a adds the received access log 33 to the access log database 130, with a code indicating the occurrence of an improper access.

(Step S89) The access policy manager 151 modifies the access policy so as to strip the browse right from the client or user who has committed an invalid access attempt. Specifically, it sets a field value of "NOT ALLOWED" to the browse access limit field. The process goes back to step S81 to repeat the above processing.

Each time a new access log is uploaded, a new hash is calculated in this way with reference to the previous hash. The resulting hashes are linked to one another, thus making it possible to ensure the continuity of access logs.

Program Storage Medium

The above-described processing mechanisms of the document access management servers 100, 100a and clients 200, 300, 300a are actually implemented on a computer system, the instructions being encoded and provided in the form of computer programs. Each computer executes such programs to provide the intended functions of the present invention. For the purpose of storage and distribution, the programs may be stored in a computer-readable storage medium. Suitable computer-readable storage media include magnetic storage media, optical discs, magneto-optical storage media, and solid state memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which case several master program files are made available on a server computer for downloading to other computers via a network.

A user computer stores necessary software components in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

To summarize the above discussion, the present invention provides the feature of collecting not only access logs, but also policy logs containing records of new access policies and updates made to existing policies. Those log records are made searchable, and a client can retrieve both access log records and policy log records that match with a given search condition. The present invention thus makes it possible to determine the exact reason for an access denial event even when the access policies are modified in the middle of operations.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable medium storing a program for managing access to documents, the program causing a computer to function as:
    an access policy database storing access policies defining conditions for permitting access to documents;
    a policy log database storing policy logs containing records of initial setup of the access policies and changes made to the access policies;
    an access log database storing access logs containing records of access made to the documents;
    an access policy manager that makes updates to the access policy database according to an access policy setup request received from a first client, the updates including addition of a new access policy to the access policy database and modification to an existing access policy in the access policy database;
    a policy log collector that collects and stores policy log records in the policy log database to record the update made to the access policy database by the access policy manager;
    an access policy sender, responsive to an access policy request from a second client, that retrieves from the access policy database an access policy of a document specified in the access policy request and sends the retrieved access policy back to the second client;
    an access log collector that receives an access log of the specified document from the second client and stores the received access log in the access log database; and
    a log searcher, responsive to a search condition given from a third client which specifies a specific document, that searches both the policy log database and the access log database to find policy log records and access log records concerning the document specified by the given search condition, sorts a set of log records in which the found policy log records and access log records are merged together, in a chronological order according to time stamps affixed thereto, and sends the sorted set of log records back to the third client.

2. The non-transitory computer-readable medium according to claim 1, wherein:
    the access log received from the second client has a signature; and
    the access log collector verifies validity of the received access log by examining whether the signature is correct or not.

3. The non-transitory computer-readable medium according to claim 2, wherein the access policy manager modifies the access policy of the specified document to inhibit the second client from making further access to the specified document, if the access log collector determines that the receive access log is invalid.

4. The non-transitory computer-readable medium according to claim 2, wherein the program further causing the computer to function as a serial number memory that stores a serial number representing how many access logs the second client has sent,
  wherein the access log collector produces a hash from the received access log and the serial number stored in the serial number memory, decrypts the signature of the received access log with a prescribed key, and recognizes validity of the signature if the produced hash coincides with the decrypted signature.

5. The non-transitory computer-readable medium according to claim 2, the program further causing the computer to function as a hash memory storing a hash produced when a previous access log is received,
  wherein the access log collector produces a hash from the received access log and the hash stored in the hash memory, decrypts the signature of the received access log with a prescribed key, and recognizes validity of the signature if the produced hash coincides with the decrypted signature.

6. The non-transitory computer-readable medium according to claim 1, wherein:
  the log searcher regularly consults the access policies stored in the access policy database to identify users who are eligible for browsing the specified document, and then consults the access log database to enumerate the eligible users who have not browsed the specified document.

7. The non-transitory computer-readable medium according to claim 6, the program further causing the computer to function as an invitation message sender that receives user names of the enumerated eligible users and sends thereto an invitation message that recommends browsing the specified document.

8. The non-transitory computer-readable medium according to claim 7, wherein the invitation message sender provides an author of the specified document with a list of the eligible users who have not browsed the specified document.

9. A computer-based apparatus for managing access to documents, comprising:
  a computer with a storage device which is configured to operate as:
  an access policy database storing access policies defining conditions for permitting access to documents;
  a policy log database storing policy logs containing records of initial setup of the access policies and changes made to the access policies;
  an access log database storing access logs containing records of access made to the documents;
  an access policy manager that makes updates to the access policy database according to an access policy setup request received from a first client, the updates including addition of a new access policy to the access policy database and modification to an existing access policy in the access policy database;
  a policy log collector that collects and stores policy log records in the policy log database to record the updates made to the access policy database by the access policy manager;
  an access policy sender, responsive to an access policy request from a second client, that retrieves from the access policy database an access policy of a document specified in the access policy request and sends the retrieved access policy back to the second client;
  an access log collector that receives an access log of the specified document from the second client and stores the received access log in the access log database; and
  a log searcher, responsive to a search condition given from a third client which specifies a specific document, that searches both the policy log database and the access log database to find policy log records and access log records concerning the document specified by the given search condition, sorts a set of log records in which the found policy log records and access log records are merged together, in a chronological order according to time stamps affixed thereto, and sends the sorted set of log records back to the third client.

10. A computer-executable method of managing access to documents, comprising:
  providing an access policy database for storing access policies defining conditions for permitting access to documents;
  providing a policy log database for storing policy logs containing records of initial setup of the access policies and changes made to the access policies;
  providing an access log database storing access logs containing records of access made to the documents;
  making updates, using a central processing unit, to the access policy database according to an access policy setup request received from a first client, the updates including addition of a new access policy to the access policy database and modification to an existing access policy in the access policy database;
  collecting and storing policy log records, using the central processing unit, in the policy log database to record the updates made to the access policy database;
  upon receipt of an access policy request from a second client, searching the access policy database, using the central processing unit, to retrieve an access policy of a document specified in the access policy request and sending the retrieved access policy back to the second client;
  receiving an access log of the specified document, using the central processing unit, from the second client and storing the received access log in the access log database; and
  upon receipt of a search condition given from a third client which specifies a specific document, searching both the policy log database and the access log database, using the central processing unit, to find policy log records and access log records concerning the document specified by the given search condition, sorting a set of log records in which the found policy log records and access log records are merged together, in a chronological order according to time stamps affixed thereto, and sending the sorted set of log records back to the third client.

* * * * *